United States Patent
Tanaka et al.

(10) Patent No.: US 12,541,073 B2
(45) Date of Patent: Feb. 3, 2026

(54) LENS UNIT

(71) Applicant: CANON KABUSHIKI KAISHA, Tokyo (JP)

(72) Inventors: Shota Tanaka, Chiba (JP); Masami Yoshida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 334 days.

(21) Appl. No.: 18/331,039

(22) Filed: Jun. 7, 2023

(65) Prior Publication Data

US 2023/0408788 A1 Dec. 21, 2023

(30) Foreign Application Priority Data

Jun. 17, 2022 (JP) .................. 2022-098473
Jun. 17, 2022 (JP) .................. 2022-098475

(51) Int. Cl.
*G02B 7/02* (2021.01)
*G02B 1/04* (2006.01)
*G02B 15/14* (2006.01)

(52) U.S. Cl.
CPC ............ *G02B 7/021* (2013.01); *G02B 1/041* (2013.01); *G02B 7/023* (2013.01); *G02B 7/026* (2013.01); *G02B 15/143* (2019.08)

(58) Field of Classification Search
CPC ......... G02B 7/021; G02B 7/023; G02B 7/026
See application file for complete search history.

(56) References Cited

U.S. PATENT DOCUMENTS

| | | | | |
|---|---|---|---|---|
| 6,204,979 | B1* | 3/2001 | Matsui | G03B 5/00 359/819 |
| 8,379,336 | B2* | 2/2013 | Lin | G02B 7/022 359/822 |
| 2007/0078402 | A1* | 4/2007 | Yang | A61M 5/3234 604/187 |
| 2015/0292673 | A1* | 10/2015 | Huber | B32B 37/1284 248/314 |
| 2019/0079262 | A1* | 3/2019 | Wang | G02B 7/003 |
| 2019/0293897 | A1* | 9/2019 | Okubo | G02B 7/023 |
| 2021/0294188 | A1* | 9/2021 | Hsu | G03B 21/142 |

FOREIGN PATENT DOCUMENTS

JP 2007065017 A 3/2007

* cited by examiner

*Primary Examiner* — Cara E Rakowski
(74) *Attorney, Agent, or Firm* — Canon U.S.A., Inc. IP Division

(57) ABSTRACT

A lens unit that fixes and holds a lens after the lens is moved and adjusted in parallel with a receiving surface to position the lens in an optical axis direction includes a lens holder configured to hold the lens and including the receiving surface, a pressing member configured to be fixed to the lens holder, and an elastic member configured to press the lens against the lens holder and located between the pressing member and the lens, wherein the lens holder includes an opening through which a tool for moving and adjusting the lens in parallel with the receiving surface by pressing an outer peripheral surface of the lens is inserted, and wherein a position of the lens is fixed by the pressing member and the elastic member.

23 Claims, 33 Drawing Sheets

LENS UNIT

BACKGROUND

Field

The present disclosure relates to a lens unit.

Description of the Related Art

A decentering adjustment for adjusting the optical axis of a lens may be carried out to meet the recent demand for a higher pixel resolution and miniaturization of a camera. In some cases, a plastic lens is used as the lens.

Japanese Patent Application Laid-Open No. 2007-065017 discusses a technique for holding a lens while performing a decentering adjustment of the lens. In the technique discussed in Japanese Patent Application Laid-Open No. 2007-065017, a lens holding member is provided with retaining claws to nip and temporarily secure the lens between the retaining claws and a receiving surface. After temporarily securing the lens between the retaining claws and the receiving surface, a decentering adjustment of the lens is performed in a state where a lens side surface is pressed by an adjustment pin through a through-hole, and an adhesive agent is introduced through an opening to fix the lens.

In the technique discussed in Japanese Patent Application Laid-Open No. 2007-065017, the lens is bonded and fixed using an adhesive agent after the decentering adjustment is performed. In this configuration, however, in the case of bonding and fixing plastic lenses with low hydrophilic properties, a sufficiently high bonding strength cannot be obtained. In this case, debonding occurs, for example, in a high-temperature or low-temperature environment, so that the lens may deviate from a decentering adjustment position. If an urging force of each retaining claw is increased to eliminate the need for fixation using an adhesive agent, the sliding load of the plastic lens increases during the decentering adjustment, which makes it difficult to finely adjust the position of the lens.

SUMMARY

The present disclosure is directed to providing a lens unit capable of reducing a positional deviation of a lens from an adjustment position in a configuration in which a decentering adjustment of a plastic lens is performed.

According to an aspect of the present disclosure, a lens unit that fixes and holds a lens after the lens is moved and adjusted in parallel with a receiving surface to position the lens in an optical axis direction includes a lens holder configured to hold the lens and including the receiving surface, a pressing member configured to be fixed to the lens holder, and an elastic member configured to press the lens against the lens holder and located between the pressing member and the lens, wherein the lens holder includes an opening through which a tool for moving and adjusting the lens in parallel with the receiving surface by pressing an outer peripheral surface of the lens is inserted, and wherein a position of the lens is fixed by the pressing member and the elastic member.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the accompanying drawings.

A lens unit according to a first exemplary embodiment will be described below with reference to FIGS. 1 to 7.

Figure 1:
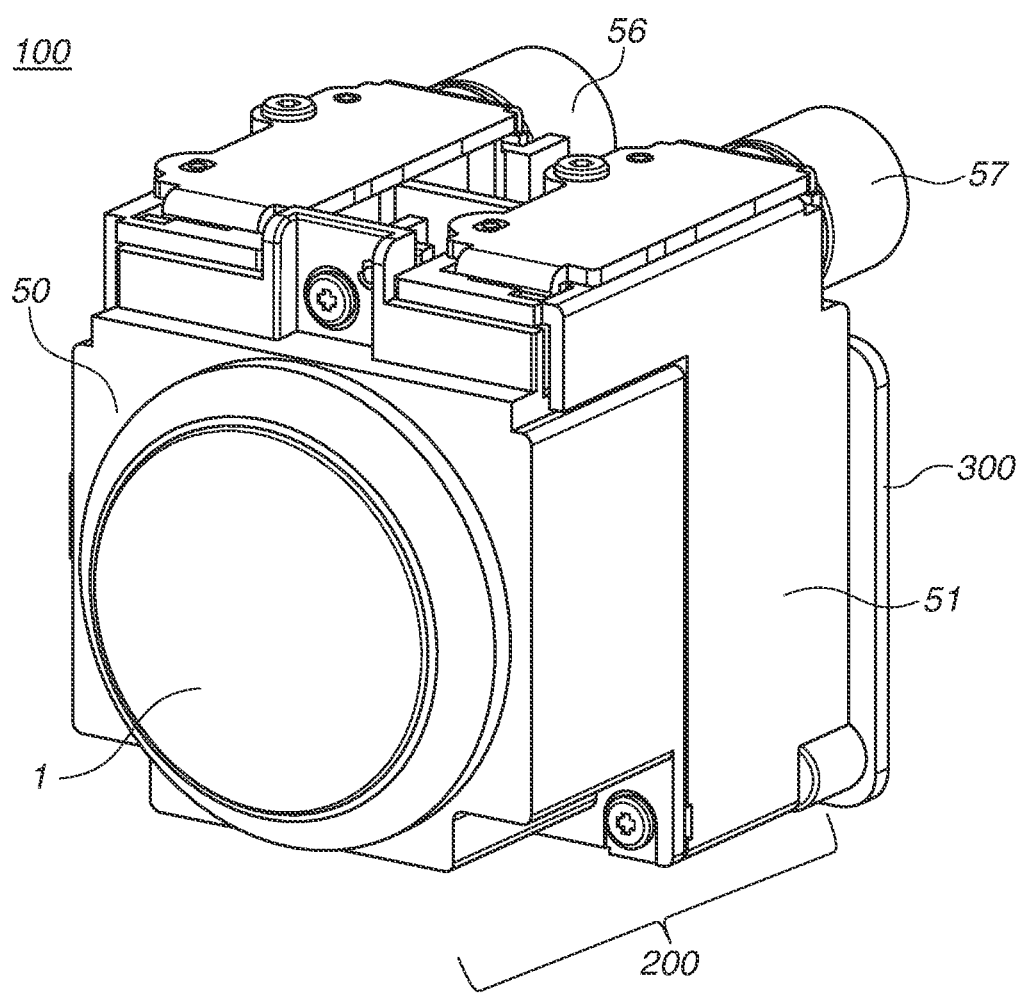
FIG. 1 is a perspective view of an image capturing apparatus according to a first exemplary embodiment.
Figure 2:
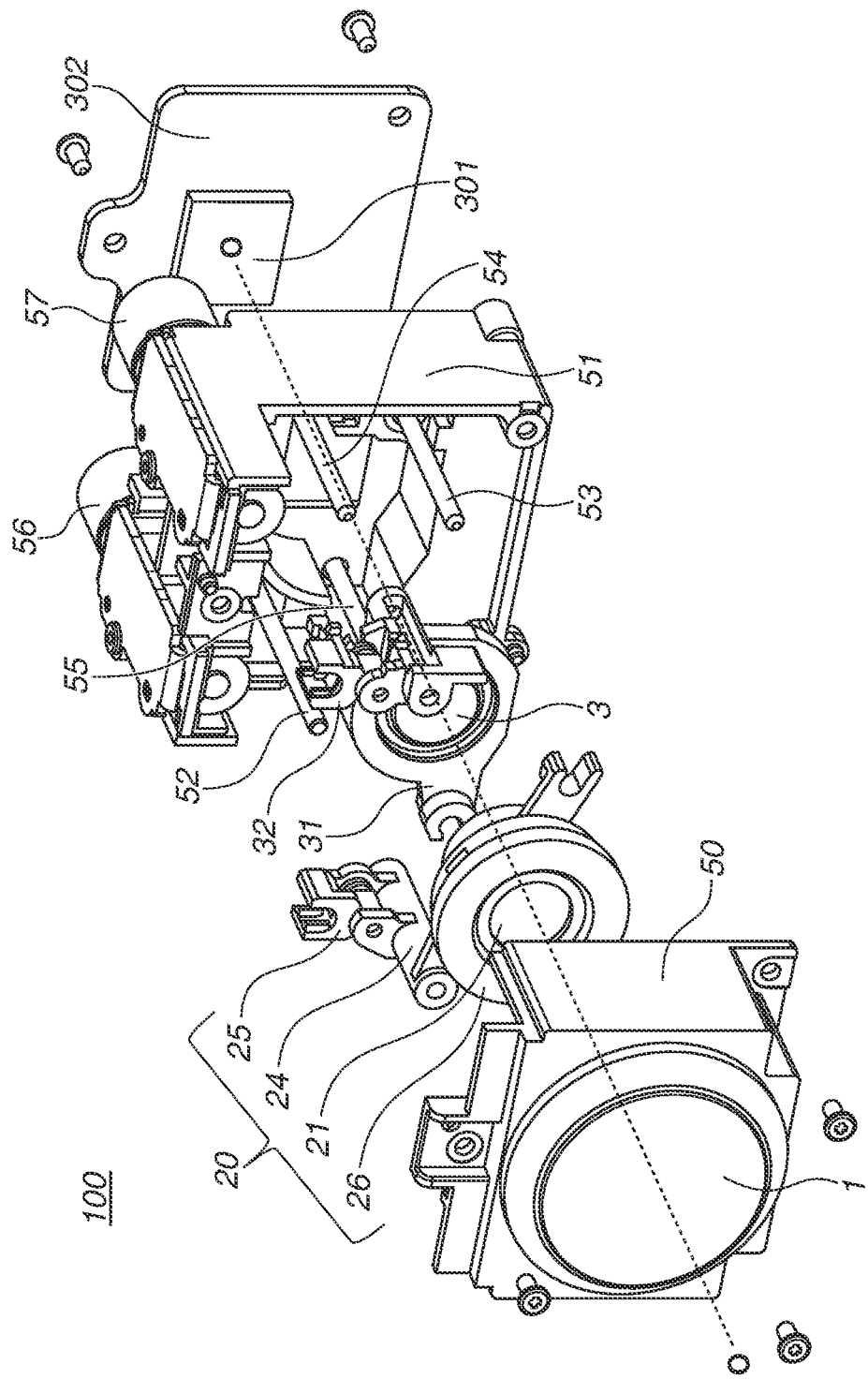
FIG. 2 is an exploded perspective view of the image capturing apparatus according to the first exemplary embodiment.

FIG. 1 is a perspective view of an image capturing apparatus 100 according to the first exemplary embodiment. FIG. 2 is an exploded perspective view of the image capturing apparatus 100 according to the first exemplary embodiment. The image capturing apparatus 100 includes an image capturing lens unit 200 and an image sensor unit 300.

The image capturing lens unit 200 includes a front-side housing member 50 and a rear-side housing member 51. The image capturing lens unit 200 includes an image capturing optical system including a first lens group 1, a second lens group 2, and a third lens group 3 in this order from an object side that is opposite to the side where the image sensor unit 300 is located.

The front-side housing member 50 is located on the object side, and the rear-side housing member 51 is located on the image capturing lens unit 200. The front-side housing member 50 is fixed to the rear-side housing member 51 with screws or the like.

The first lens group 1 is fixed to the front-side housing member 50 by thermal caulking or the like. The second lens group 2 is held by a lens holder 24. The lens holder 24 engages with a guide bar 52 and is movably supported in the direction of an optical axis O of the image capturing optical system. The lens holder 24 also engages with a guide bar 53, and the rotation of the lens holder 24 around the guide bar 52 is regulated by the guide bar 53. The lens holder 24 holds a second group rack 25. The second group rack 25 engages with a lead screw portion of a second group driving portion 56 including an actuator such as a stepping motor. The rotation of the lead screw portion by the second group driving portion 56 allows the lens holder 24 and the second group rack 25 to be moved in the direction of the optical axis O of the image capturing optical system. The lens holder 24, the second group rack 25, the second lens group 2, a pressing member 26, and an elastic member 27 constitute a lens unit 20. The lens unit 20 will be described in detail below.

The third lens group 3 is held by a third lens group frame 31. The third lens group frame 31 engages with a guide bar 54 and is movably supported in the direction of the optical axis O of the image capturing optical system. The third lens group frame 31 also engages with a guide bar 55, and the rotation of the third lens group frame 31 around the guide bar 54 is regulated by the guide bar 55. The third lens group frame 31 holds a third group rack 32. The third group rack 32 engages with a lead screw portion of a third group driving portion 57 including an actuator such as a stepping motor.

The rotation of the lead screw portion by the third group driving portion 57 allows the third lens group frame 31 and the third group rack 32 to be moved in the direction of the optical axis O of the image capturing optical system. The second lens group 2 and the third lens group 3 are moved in the direction of the optical axis O of the image capturing optical system, to perform zooming and focusing of the image capturing optical system. The guide bars 52, 53, 54, and 55 are held between the front-side housing member 50 and the rear-side housing member 51. The second group driving portion 56 and the third group driving portion 57 are fixed to the rear-side housing member 51 with screws or the like.

The image sensor unit 300 includes an image sensor 301 and an image capturing substrate 302. The image sensor 301 is mounted on the image capturing substrate 302. The image capturing substrate 302 is fixed to the rear-side housing member 51 with screws or the like. The image capturing substrate 302 may be fixed to the rear-side housing member 51 using another member. The configuration of the image capturing substrate 302 is not limited to this example. Light collected by the image capturing lens unit 200 is focused on the image sensor 301 to obtain an image.

Figure 3:
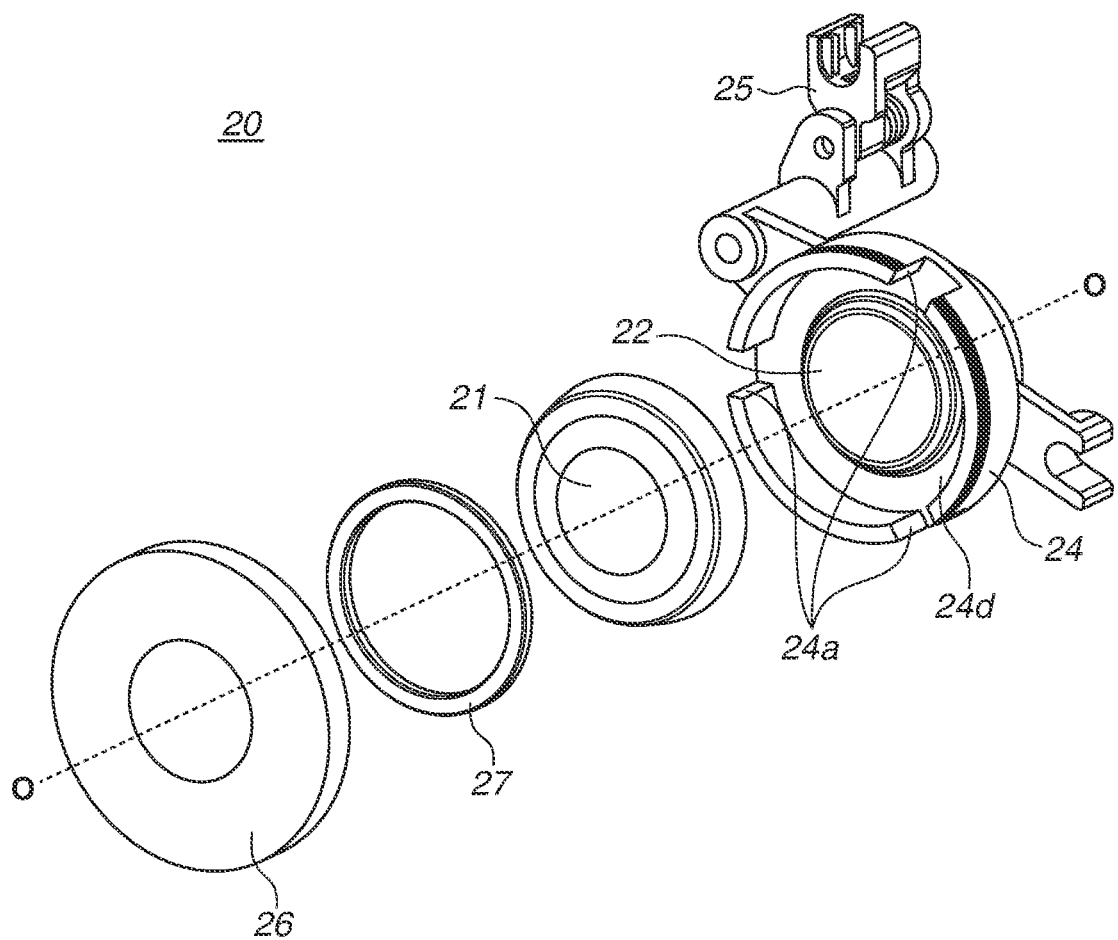
FIG. 3 is an exploded perspective view of a lens unit according to the first exemplary embodiment.
Figure 4:
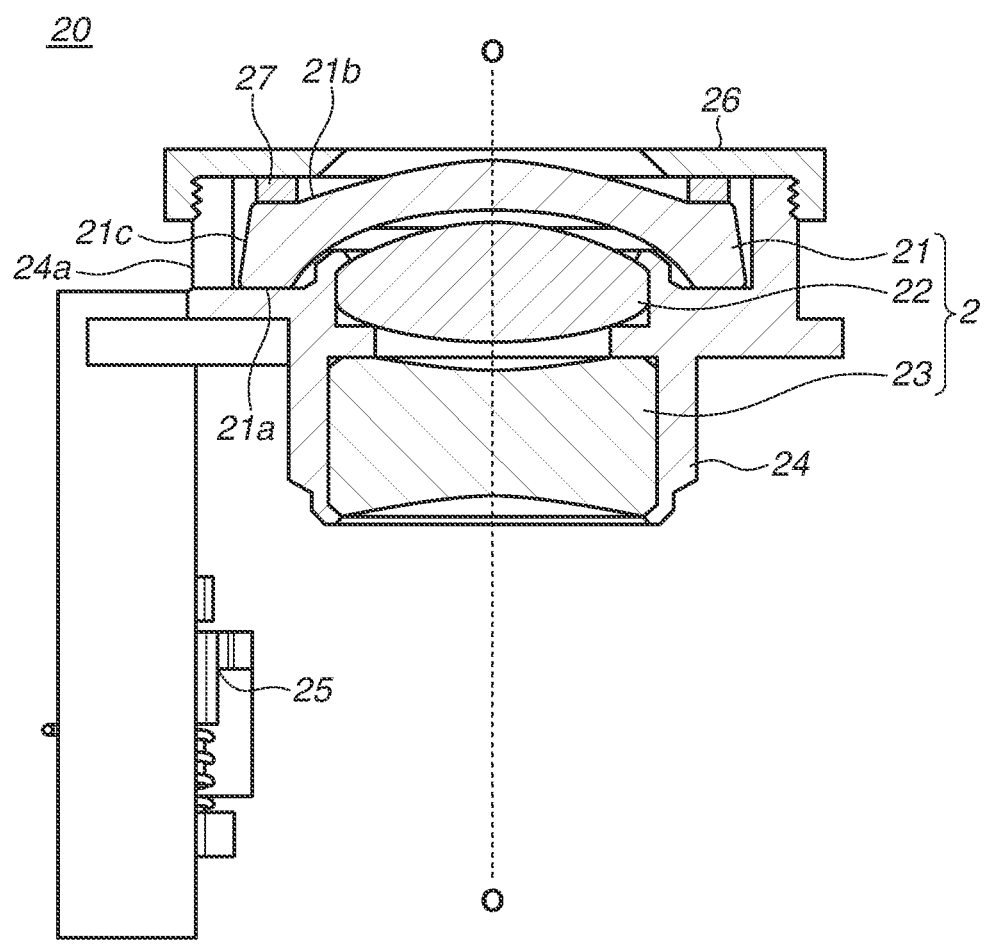
FIG. 4 is a side sectional view of the lens unit according to the first exemplary embodiment.

FIG. 3 is an exploded perspective view of the lens unit 20 according to the first exemplary embodiment. FIG. 4 is a side sectional view of the lens unit 20 according to the first exemplary embodiment. The lens unit 20 includes the second lens group 2, the lens holder 24, the second group rack 25, the pressing member 26, and the elastic member 27.

The second lens group 2 includes an adjustment lens 21, a lens 22, and a lens 23. The lens 22 and the lens 23 are fixed to the lens holder 24 by thermal caulking. Examples of the method of fixing the lenses 22 and 23 may include fixation by bonding with an adhesive agent and fixation by pressing with a pressing member. The fixing method is not limited to the method used in the present exemplary embodiment.

The adjustment lens 21 is a plastic lens. The adjustment lens 21 is formed by molding. The surface of the adjustment lens 21 that is in contact with the lens holder 24 corresponds to a first surface 21a. The surface of the adjustment lens 21 that is located on the opposite side of the first surface 21a in the direction of the optical axis O corresponds to a second surface 21b. A portion that connects the first surface 21a and the second surface 21b of the adjustment lens 21 corresponds to a side surface portion 21c. The side surface portion 21c includes a surface that is inclined such that the surface is gradually spaced apart from the optical axis O toward the first surface 21a from the second surface 21b in the direction of the optical axis O. The inclined surface of the side surface portion 21c need not necessarily correspond to the entire surface of the side surface portion 21c, and may correspond to only a partial area of the side surface portion 21c. Alternatively, the side surface portion 21c may be parallel to the optical axis O. The adjustment lens 21 may include a protrusion that is a gate mark formed by molding.

The lens holder 24 is a member that holds the second lens group 2. The lens holder 24 has a substantially cylindrical shape. The lens holder 24 includes a receiving surface 24d that positions each lens. The receiving surface 24d positions each lens in the direction of the optical axis O. The lens holder 24 includes three notch portions 24a that are opened in a direction perpendicular to the optical axis O. Each notch portion 24a is a portion through which a tool for moving and adjusting the adjustment lens 21 in parallel with the receiving surface 24d of the lens holder 24 by pressing the outer peripheral surface of the adjustment lens 21 is inserted. The notch portions 24a are provided at three locations that substantially equally divide a peripheral wall of the lens holder 24 in the circumferential direction. Each notch portion 24a is opened in the direction perpendicular to the optical axis O. In other words, each notch portion 24a is opened such that the adjustment lens 21 can be seen therethrough in the direction perpendicular to the optical axis O. The side surface portion 21c (outer peripheral surface) of the adjustment lens 21 is exposed from the notch portions 24a even in a state where the pressing member 26 is fixed to the lens holder 24. There is no need to provide three notch portions 24a, as long as at least one notch portion 24a is provided.

The second group rack 25 transmits a driving force from the second group driving portion 56 to the second lens group 2. The second group rack 25 engages with the lead screw portion of the second group driving portion 56 including the actuator such as a stepping motor.

The pressing member 26 is a member that presses the elastic member 27 and the adjustment lens 21. The pressing member 26 is in contact with the elastic member 27. The pressing member 26 has a circular shape.

The elastic member 27 is a member for fixing the adjustment lens 21. The elastic member 27 has a circular shape. The elastic member 27 is sandwiched and compressed between the pressing member 26 and the adjustment lens 21.

The lens holder 24 and the pressing member 26 each include a screw portion. The pressing member 26 threadedly engages with the lens holder 24 and is fixed to the lens holder 24. The elastic member 27 and the adjustment lens 21 are located in this order from the side of the pressing member 26 between the pressing member 26 and the lens holder 24 in the direction of the optical axis O. The pressing member 26 threadedly engages with the lens holder 24 and is fixed to the lens holder 24, so that the elastic member 27 is sandwiched and compressed between the pressing member 26 and the adjustment lens 21. Compressing the elastic member 27 enables the elastic member 27 to urge the adjustment lens 21 against the lens holder 24 in the direction of the optical axis O, so that the adjustment lens 21 is held by the lens holder 24. Examples of the method of fixing the lens holder 24 and the pressing member 26 may include fixation by snap-fit, bonding, and fastening with screws. The fixing method is not limited to the method used in the present exemplary embodiment.

Figure 5:
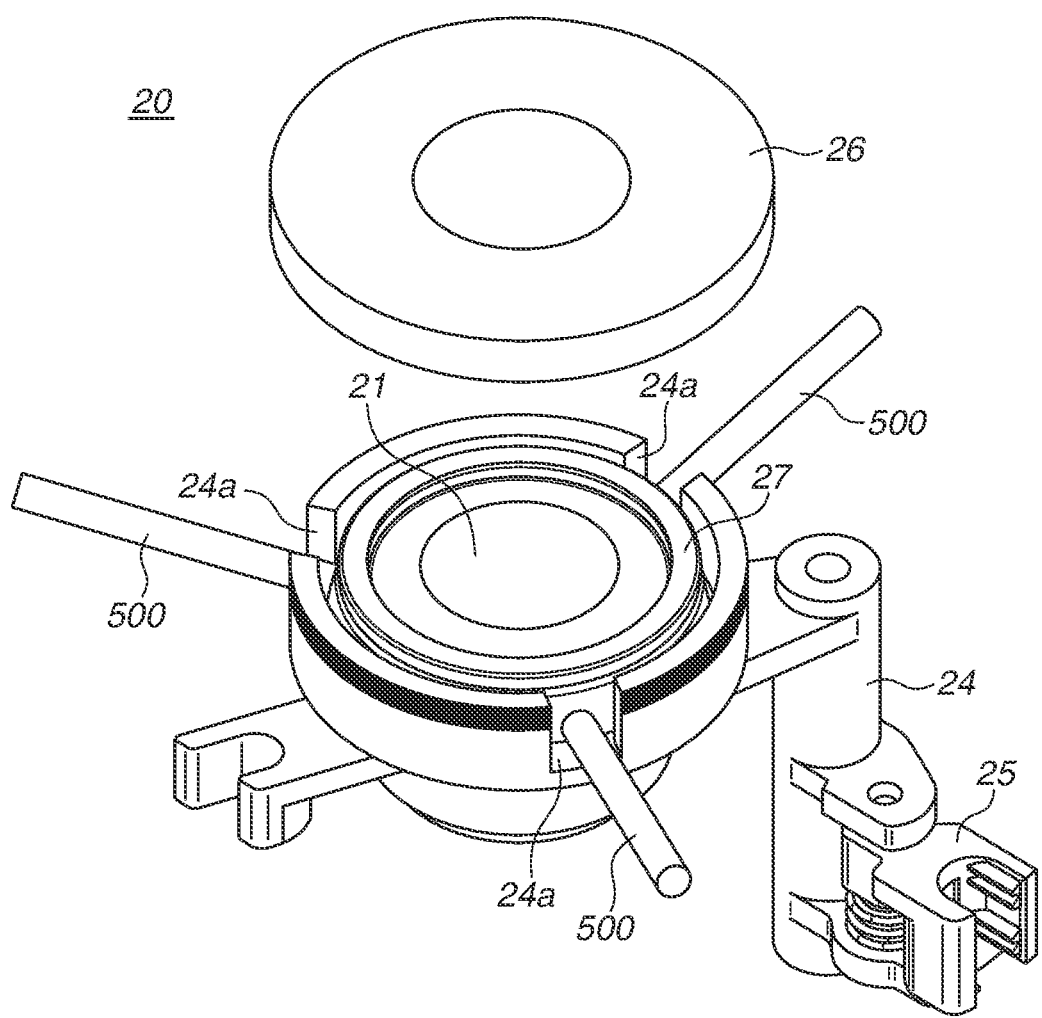
FIG. 5 is a perspective view of the lens unit according to the first exemplary embodiment before decentering adjustment.
Figure 6:
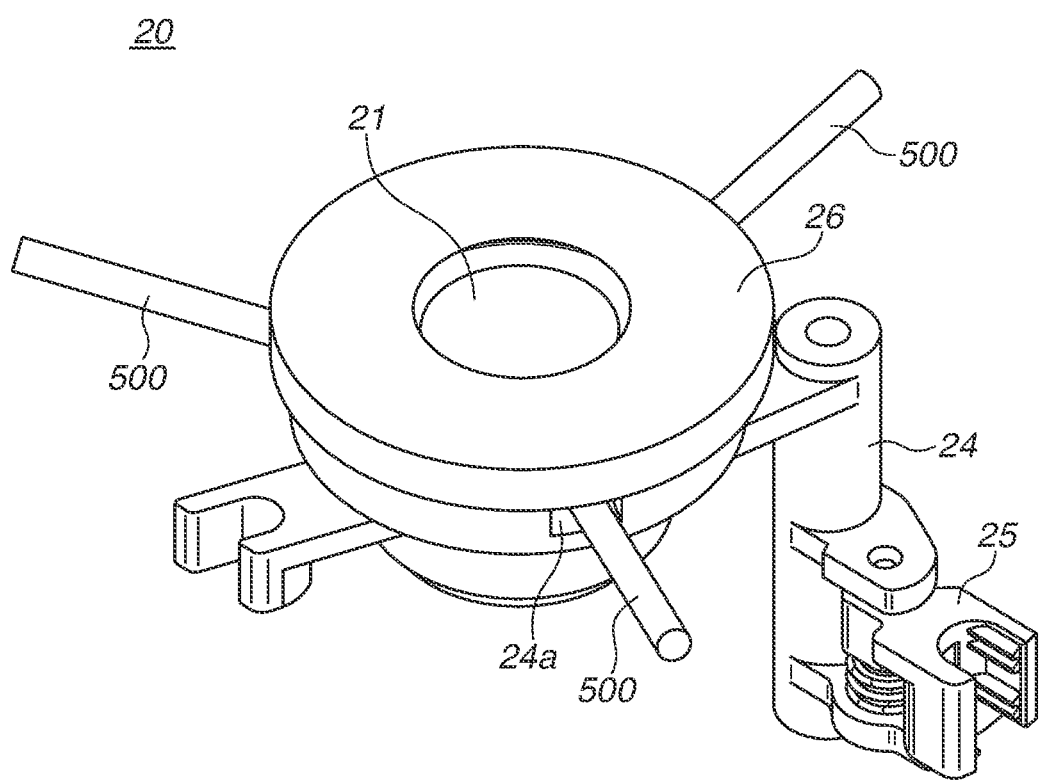
FIG. 6 is a perspective view of the lens unit according to the first exemplary embodiment after decentering adjustment.
Figure 7:
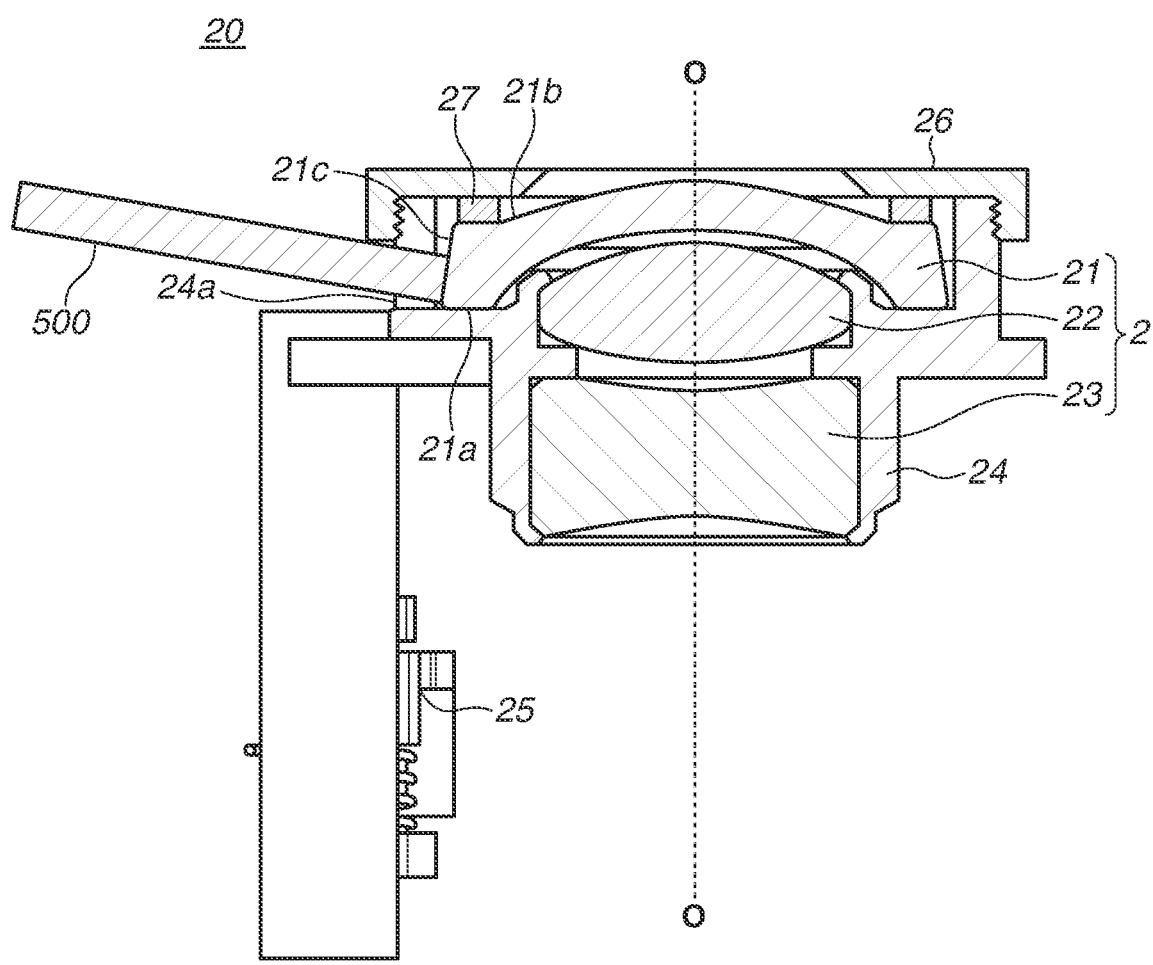
FIG. 7 is a side sectional view of the lens unit according to the first exemplary embodiment after decentering adjustment.

FIG. 5 is a perspective view of the lens unit 20 according to the first exemplary embodiment before decentering adjustment. FIG. 6 is a perspective view of the lens unit 20 according to the first exemplary embodiment after decentering adjustment. FIG. 7 is a side sectional view of the lens unit 20 according to the first exemplary embodiment after decentering adjustment.

A method for performing decentering adjustment of the adjustment lens 21 and holding the adjustment lens 21 will be described below.

In the case of performing decentering adjustment of the adjustment lens 21, adjustment jigs 500, such as pins, are inserted into the notch portions 24a to press the side surface portion 21c of the adjustment lens 21. The adjustment jigs 500 may be configured to adsorb the adjustment lens 21. The number of the adjustment jigs 500 is not particularly limited, as long as at least one adjustment jig 500 is provided. Each adjustment jig 500 is caused to advance or recede while an image is checked. This allows the adjustment lens 21 to be moved to a desired position in the direction perpendicular to the optical axis O with respect to the lens holder 24.

At this time, the adjustment lens 21 is pressed in the direction perpendicular to the side surface portion 21c by the adjustment jigs 500, so that the adjustment lens 21 is urged against the lens holder 24 in the direction of the optical axis O. This prevents lifting of the adjustment lens 21 from the lens holder 24.

During the decentering adjustment, since the adjustment lens 21 is not urged by the elastic member 27, the decentering adjustment can be smoothly carried out in the direction perpendicular to the optical axis O. The decentering adjustment may be performed in a state where the pressing member 26 threadedly engages with the lens holder 24 to a position where the elastic member 27 is not compressed. Alternatively, the decentering adjustment may be performed in a state where the pressing member 26 threadedly engages with the lens holder 24 to a position where the elastic member 27 is compressed to such an extent that only the sliding resistance with which the decentering adjustment can be sufficiently smoothly carried out is generated and the adjustment lens 21 is urged. The decentering adjustment is performed in a state where the adjustment lens 21 is slightly urged by the elastic member 27, thereby preventing lifting of the adjustment lens 21 from the lens holder 24, regardless of the shape of the side surface portion 21c. The pressing member 26 threadedly engages with the lens holder 24 in a state where the decentering adjustment is completed. At this time, the position of the adjustment lens 21 is regulated by the adjustment jigs 500, thereby preventing the position of the adjustment lens 21 from deviating from the desired position obtained as a result of the decentering adjustment. The position of the adjustment lens 21 is regulated by the adjustment jigs 500 until the pressing member 26 is fixed to the lens holder 24. Thus, the adjustment lens 21 is held by the lens holder 24 at the desired position obtained as a result of the decentering adjustment. The adjustment jigs 500 are removed after holding of the adjustment lens 21 is completed, so that the decentering adjustment and holding of the adjustment lens 21 are completed.

It is desirable to satisfy $\mu1<\mu6$ or $\mu2<\mu6$ where "0" represents a friction coefficient between the elastic member 27 and the pressing member 26, "$\mu2$" represents a friction coefficient between the elastic member 27 and the adjustment lens 21, and "$\mu6$" represents a friction coefficient between the adjustment lens 21 and the lens holder 24. Satisfying this relationship allows the elastic member 27 to slide to prevent the rotation of the adjustment lens 21 even in a case where a load is generated in a rotational direction about the optical axis O when the pressing member 26 threadedly engages with the lens holder 24. A light-shielding member or the like may be disposed on an opening of each notch portion 24a to close the opening after holding of the adjustment lens 21 is completed. When the pressing member 26 is fixed to the lens holder 24 in a state where the decentering adjustment is completed, the adjustment lens 21 is held by the lens holder 24 while the adjustment lens 21 remains at the desired position obtained as a result of the decentering adjustment. In other words, the adjustment lens 21 can be held using a mechanical method, instead of using a bonding method, after the decentering adjustment. This leads to a reduction in a positional deviation from a lens adjustment position even in a high-temperature or low-temperature environment. Since the adjustment lens 21 can be held by the lens holder 24 due to an urging force in the direction of the optical axis O, the adjustment lens 21 receives no load in the direction perpendicular to the optical axis O, and thus an optical surface is less likely to be distorted. Further, the elastic member 27 urges the surface of the adjustment lens 21 with a substantially equal force, thereby preventing a stress from being concentrated on a part of the adjustment lens 21. Accordingly, the stress applied to the adjustment lens 21 can be distributed even when the adjustment lens 21 is urged with a force required for holding the adjustment lens 21, thereby reducing the distortion of the optical surface.

According to the present exemplary embodiment, it is possible to provide the lens unit 20 in which a positional deviation from the adjustment position can be reduced in the case of performing a decentering adjustment of the adjustment lens 21.

The lens unit 20 according to a second exemplary embodiment will be described below with reference to FIG. 8. In the present exemplary embodiment, components common to those of the first exemplary embodiment are denoted by the same reference numerals as those in the first exemplary embodiment. Descriptions of items common to those in the first exemplary embodiment are omitted. While the lens holder 24 is provided with the notch portions 24a in the first exemplary embodiment, the lens holder 24 is provided with openings 24b (through-holes) in the second exemplary embodiment.

Figure 8:
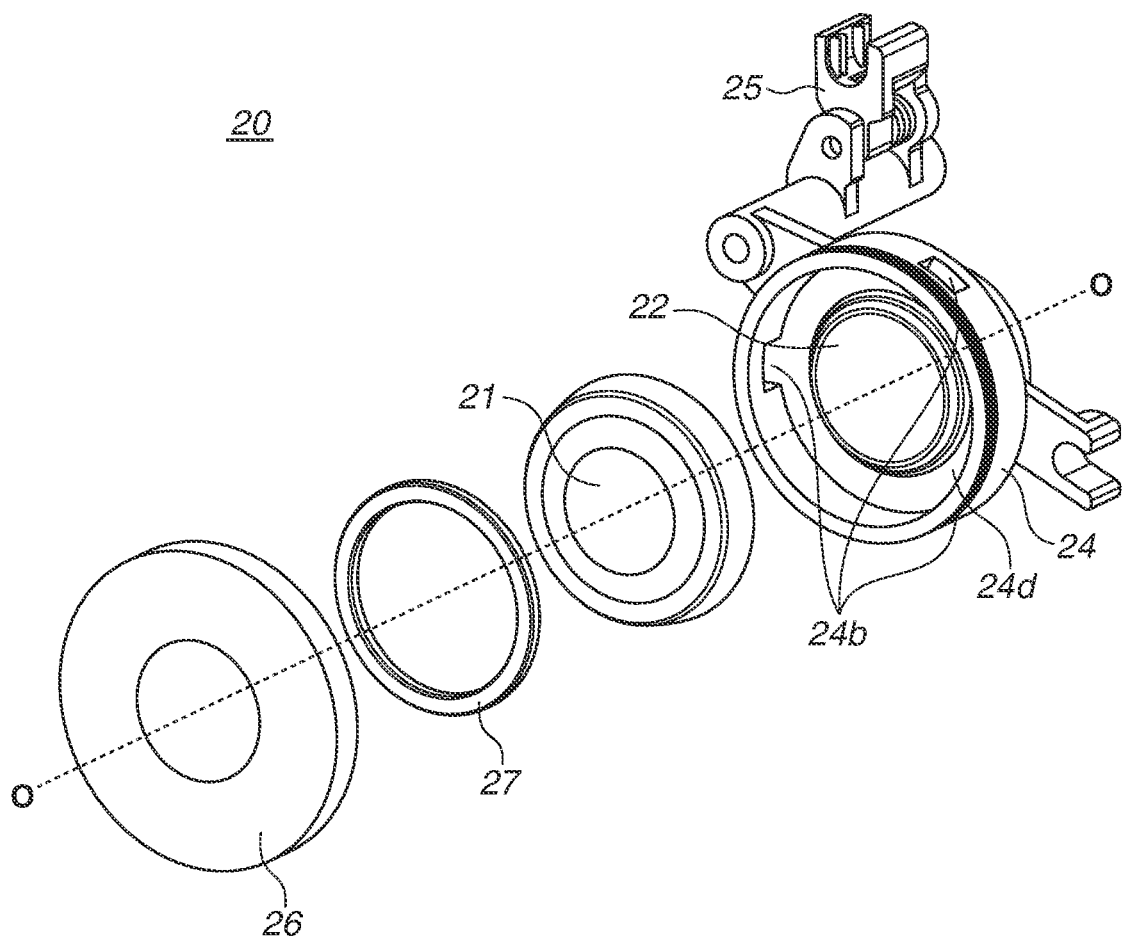
FIG. 8 is an exploded perspective view of a lens unit according to a second exemplary embodiment.

FIG. 8 is an exploded perspective view of the lens unit 20 according to the second exemplary embodiment. The lens holder 24 is a member that holds the second lens group 2. The lens holder 24 has a substantially cylindrical shape. The lens holder 24 includes the receiving surface 24d that positions each lens. The lens holder 24 includes three openings 24b (through-holes) that are opened in the direction perpendicular to the optical axis O. Each opening 24b is an opening through which a tool for moving and adjusting the adjustment lens 21 in parallel with the receiving surface 24d of the lens holder 24 by pressing the outer peripheral surface of the adjustment lens 21 is inserted. The openings 24b are provided at three locations that substantially equally divide the peripheral wall of the lens holder 24 in the circumferential direction. Each opening 24b penetrates through a side surface of the lens holder 24. Each opening 24b is opened in the direction perpendicular to the optical axis O. In other words, each opening 24b is opened such that the adjustment lens 21 can be seen therethrough in the direction perpendicular to the optical axis O. The outer peripheral surface of the adjustment lens 21 is exposed from the openings 24b even in a state where the pressing member 26 is fixed to the lens holder 24. There is no need to provide three openings 24b, as long as at least one opening 24b is provided.

The decentering adjustment and the holding method are similar to those in the first exemplary embodiment.

According to the present exemplary embodiment, like in the first exemplary embodiment, it is possible to provide the lens unit 20 in which a positional deviation from the adjustment position can be reduced in the case of performing the decentering adjustment of the adjustment lens 21.

The lens unit 20 according to a third exemplary embodiment will be described below with reference to FIGS. 9 and 10. In the present exemplary embodiment, components common to those of the first exemplary embodiment are denoted by the same reference numerals as those in the first exemplary embodiment. Descriptions of components common to those of the first exemplary embodiment are omitted. The lens unit 20 according to the third exemplary embodiment includes a plate member 28.

Figure 9:
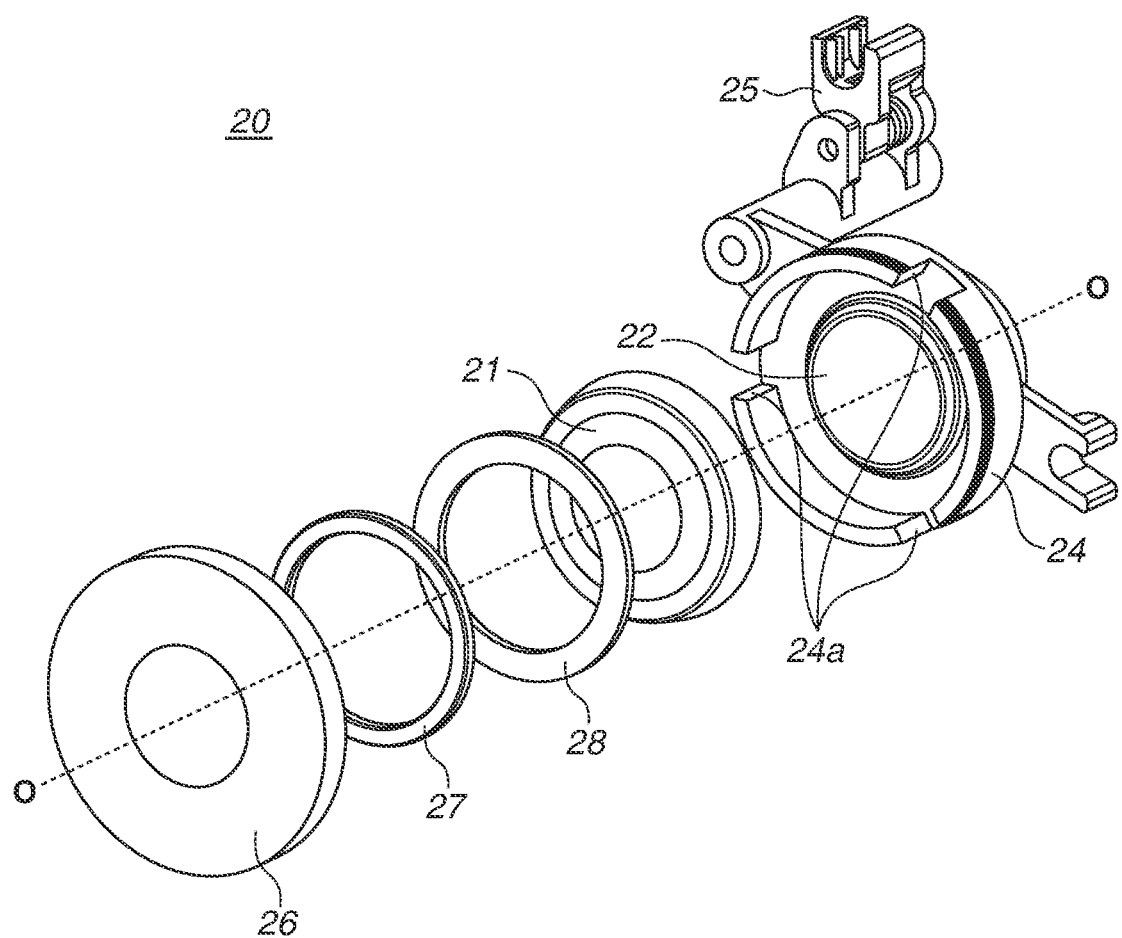
FIG. 9 is an exploded perspective view of a lens unit according to a third exemplary embodiment.
Figure 10:
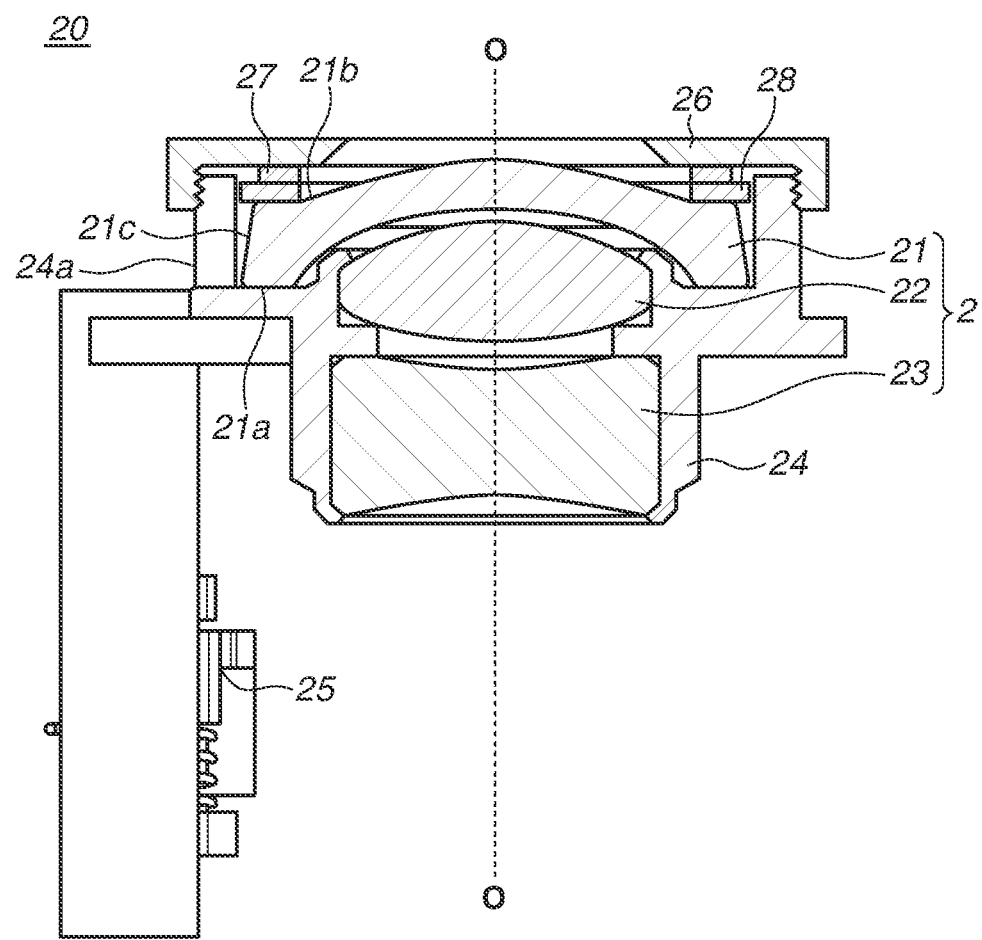
FIG. 10 is a side sectional view of the lens unit according to the third exemplary embodiment.

FIG. 9 is an exploded perspective view of the lens unit 20 according to the third exemplary embodiment. FIG. 10 is a side sectional view of the lens unit 20 according to the third exemplary embodiment.

The lens unit 20 includes the second lens group 2, the lens holder 24, the second group rack 25, the pressing member 26, the elastic member 27, and the plate member 28.

The elastic member 27, the plate member 28, and the adjustment lens 21 are located in this order from the side of the pressing member 26 between the pressing member 26 and the lens holder 24 in the direction of the optical axis O. The pressing member 26 threadedly engages with the lens holder 24 and is fixed to the lens holder 24, thereby allowing the elastic member 27 to be sandwiched and compressed between the pressing member 26 and the plate member 28. Compressing the elastic member 27 enables the elastic member 27 to urge the adjustment lens 21 against the lens holder 24 together with the plate member 28 in the direction of the optical axis O, so that the adjustment lens 21 is held by the lens holder 24.

The decentering adjustment and the holding method are similar to those in the first exemplary embodiment. It is desirable to satisfy $\mu1<\mu6$, $\mu3<\mu6$, or $\mu4<\mu6$ where "$\mu1$" represents a friction coefficient between the elastic member 27 and the pressing member 26, "$\mu3$" represents a friction coefficient between the elastic member 27 and the plate member 28, "$\mu4$" represents a friction coefficient between the plate member 28 and the adjustment lens 21, and "$\mu6$" represents a friction coefficient between the adjustment lens 21 and the lens holder 24. Satisfying this relationship enables the elastic member 27 or the plate member 28 to slide to prevent the rotation of the adjustment lens 21 even in a case where a load is generated in the direction of the optical axis O when the pressing member 26 threadedly engages with the lens holder 24.

Also, in the present exemplary embodiment, like in the second exemplary embodiment, the lens holder 24 may include the openings 24b instead of the notch portions 24a.

According to the present exemplary embodiment, like in the first exemplary embodiment, it is possible to provide the lens unit 20 in which a positional deviation from the adjustment position can be reduced in the case of performing the decentering adjustment of the adjustment lens 21. Even in a case where the elastic member 27 is made of a material that is less likely to slide, the rotation of the adjustment lens 21 can be prevented due to sliding of the plate member 28.

The lens unit 20 according to a fourth exemplary embodiment will be described below with reference to FIGS. 11 to 12. In the present exemplary embodiment, components common to those of the first exemplary embodiment are denoted by the same reference numerals as those in the first exemplary embodiment. Descriptions of components common to those of the first exemplary embodiment are omitted. Like in the third exemplary embodiment, the lens unit 20 according to the fourth exemplary embodiment includes the plate member 28, and the plate member 28 also functions as a fixed diaphragm. In addition, the fourth exemplary embodiment differs from the third exemplary embodiment in the layout of the plate member 28 and the elastic member 27.

Figure 11:
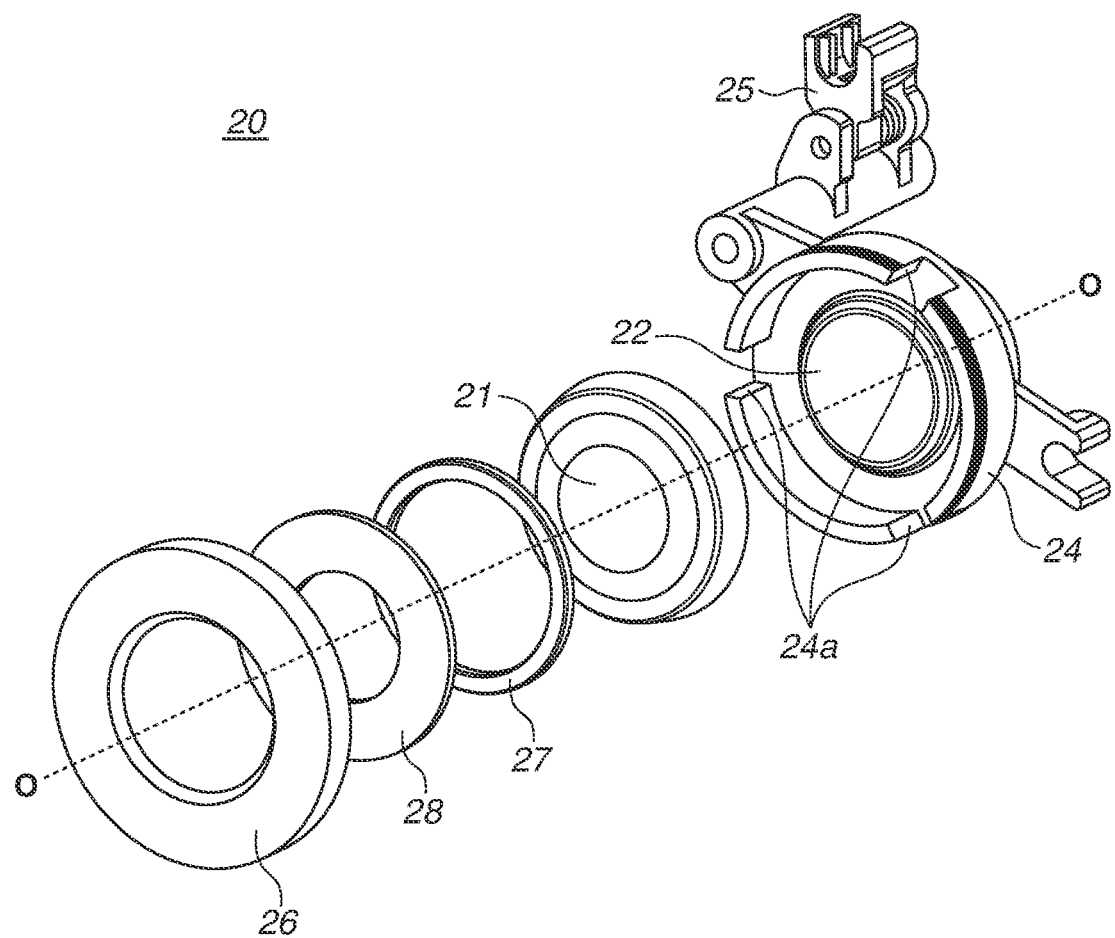
FIG. 11 is an exploded perspective view of a lens unit according to a fourth exemplary embodiment.
Figure 12:
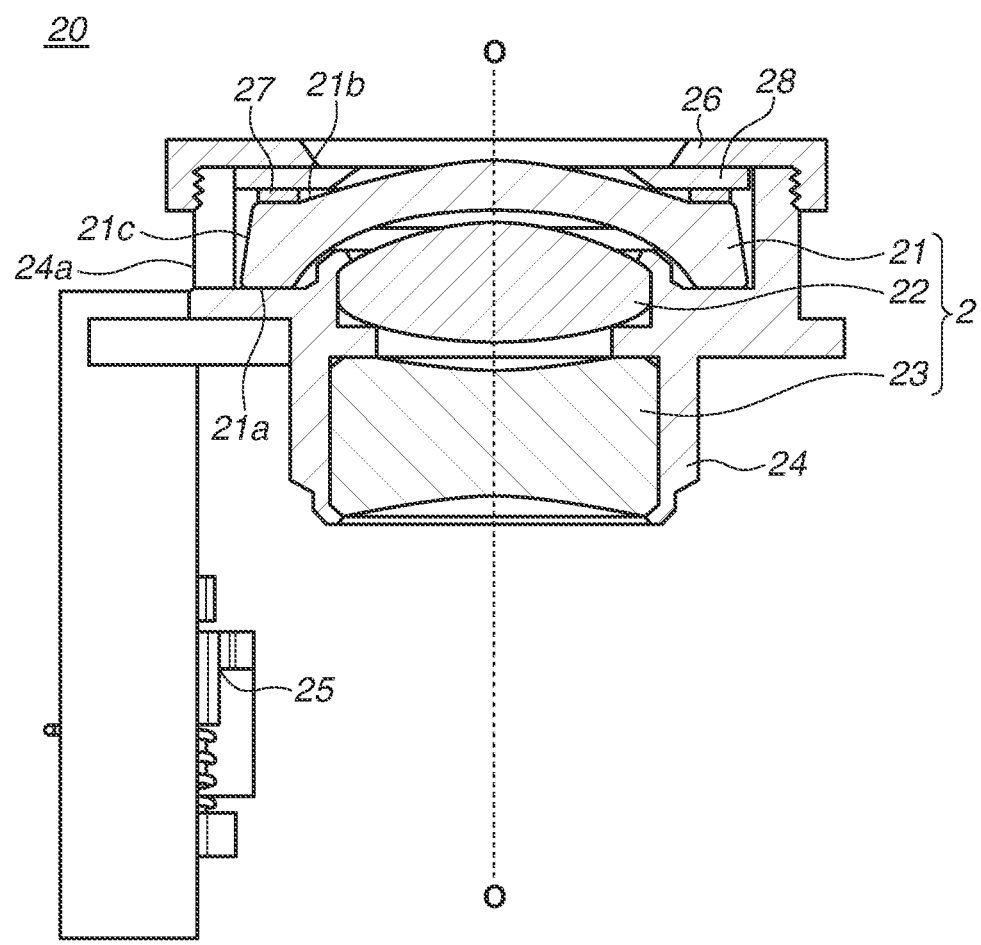
FIG. 12 is a side sectional view of the lens unit according to the fourth exemplary embodiment.

FIG. 11 is an exploded perspective view of the lens unit 20 according to the fourth exemplary embodiment. FIG. 12 is a side sectional view of the lens unit 20 according to the fourth exemplary embodiment.

The plate member 28 functions as the fixed diaphragm and prevents unwanted light from entering the adjustment lens 21. Since the plate member 28 has such a light-shielding function, the inner diameter of the plate member 28 according to the fourth exemplary embodiment is smaller than that of the third exemplary embodiment. The plate member 28, the elastic member 27, and the adjustment lens 21 are located in this order from the side of the pressing member 26 between the pressing member 26 and the lens holder 24 in the direction of the optical axis O. The pressing member 26 is fitted in with the lens holder 24 and is fixed to the lens holder 24, thereby allowing the elastic member 27 to be sandwiched and compressed between the plate member 28 and the adjustment lens 21. Compressing the elastic member 27 enables the elastic member 27 to urge the adjustment lens 21 against the lens holder 24 in the direction of the optical axis O, so that the adjustment lens 21 is held by the lens holder 24.

The decentering adjustment and the holding method are similar to those in the first exemplary embodiment. It is desirable to satisfy $\mu2<\mu6$, $\mu3<\mu6$, or $\mu5<\mu6$ where "$\mu2$" represents a friction coefficient between the elastic member 27 and the adjustment lens 21, "$\mu3$" represents a friction coefficient between the elastic member 27 and the plate member 28, "$\mu5$" represents a friction coefficient between the plate member 28 and the pressing member 26, and "$\mu6$" represents a friction coefficient between the adjustment lens 21 and the lens holder 24. Satisfying this relationship enables the elastic member 27 or the plate member 28 to slide to prevent the rotation of the adjustment lens 21 even in a case where a load is generated in the rotational direction about the optical axis O when the pressing member 26 threadedly engages with the lens holder 24.

Also, in the present exemplary embodiment, like in the second exemplary embodiment, the lens holder 24 may include the openings 24b instead of the notch portions 24a.

According to the present exemplary embodiment, like in the first exemplary embodiment, it is possible to provide the lens unit 20 in which a positional deviation from the adjustment position can be reduced in the case of performing the decentering adjustment of the adjustment lens 21. Like in the third exemplary embodiment, the rotation of the adjustment lens 21 can be prevented. Further, the plate member 28 also functions as the fixed diaphragm, which leads to a reduction in the number of components.

The lens unit 20 according to a fifth exemplary embodiment will be described below with reference to FIG. 13. In the present exemplary embodiment, components common to those of the fourth exemplary embodiment are denoted by the same reference numerals as those in the fourth exemplary embodiment. Descriptions of components common to those of the fourth exemplary embodiment are omitted. The lens unit 20 according to the fifth exemplary embodiment is different from the lens unit 20 according to the fourth exemplary embodiment in the shape of the adjustment lens 21.

Figure 13:
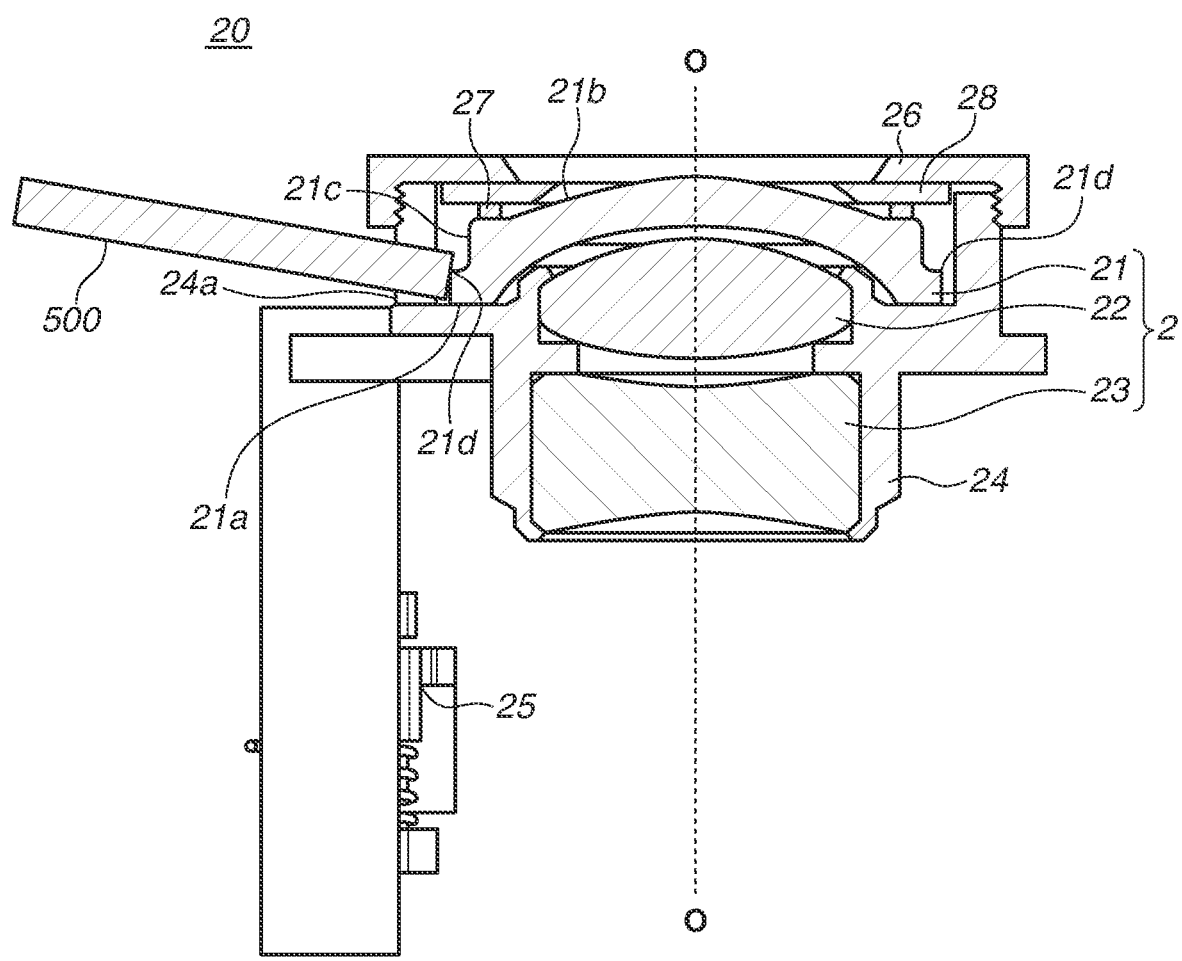
FIG. 13 is a side sectional view of the lens unit according to a fifth exemplary embodiment during decentering adjustment.

FIG. 13 is a side sectional view of the lens unit 20 according to the fifth exemplary embodiment during decentering adjustment.

The side surface portion 21c of the adjustment lens 21 has a step shape, and includes an edge portion 21d corresponding to an edge portion of the step shape. Each notch portion 24a is opened in the direction perpendicular to the optical axis O. In other words, each notch portion 24a is opened such that the adjustment lens 21 can be seen therethrough in the direction perpendicular to the optical axis O. The edge portion 21d of the adjustment lens 21 is exposed from the notch portions 24a even in a state where the pressing member 26 is fixed to the lens holder 24.

The side surface portion 21c may have any shape other than a step shape, as long as the side surface portion 21c includes the edge portion 21d. For example, the connecting portion between the second surface 21b and the side surface portion 21c of the adjustment lens 21 may have a chamfered shape to form the edge portion 21d. The edge portion 21d may be chamfered.

The decentering adjustment and the holding method for the adjustment lens 21 will be described below. In the case of performing the decentering adjustment of the adjustment lens 21, the adjustment jigs 500, such as pins, are inserted into the three notch portions 24a to press the edge portion 21d of the adjustment lens 21. At this time, the adjustment jigs 500 press the edge portion 21d not in the direction perpendicular to the optical axis O, but in the direction toward the lens holder 24. This enables the adjustment lens 21 to be urged against the lens holder 24 in the direction of the optical axis O, thereby preventing lifting of the adjustment lens 21 from the lens holder 24. Further, the adjustment lens 21 is held by the lens holder 24 at the desired position obtained as a result of the decentering adjustment in the same methods as the decentering adjustment method and the holding method according to the first exemplary embodiment.

In the present exemplary embodiment, like in the first exemplary embodiment, the plate member 28 may be omitted.

Like in the second exemplary embodiment, the lens holder 24 may include the openings 24b instead of the notch portions 24a. Like in the third exemplary embodiment, the plate member 28 may be located between the elastic member 27 and the adjustment lens 21.

According to the present exemplary embodiment, like in the first exemplary embodiment, it is possible to provide the lens unit 20 in which a positional deviation from the adjustment position can be reduced in the case of performing the decentering adjustment of the adjustment lens 21. Further, like in the fourth exemplary embodiment, the rotation of the adjustment lens 21 can be prevented.

The lens unit 20 according to a sixth exemplary embodiment will be described below with reference to FIGS. 14 and 15. In the present exemplary embodiment, components common to those of the fourth exemplary embodiment are denoted by the same reference numerals as those in the fourth exemplary embodiment. Descriptions of components common to those of the fourth exemplary embodiment are omitted. The lens unit 20 according to the sixth exemplary embodiment is different from the lens unit 20 according to the fourth exemplary embodiment in the shape of the adjustment lens 21.

Figure 14:
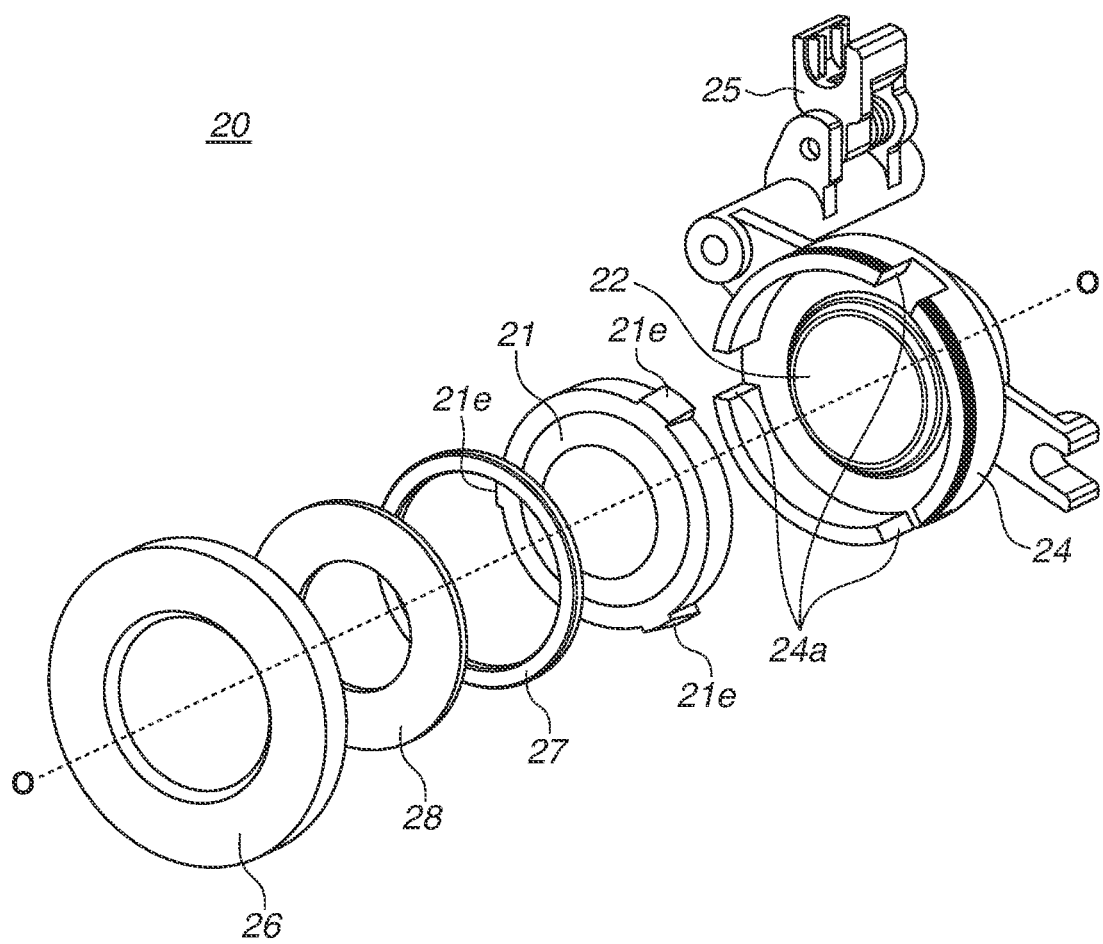
FIG. 14 is an exploded perspective view of a lens unit according to a sixth exemplary embodiment.
Figure 15:
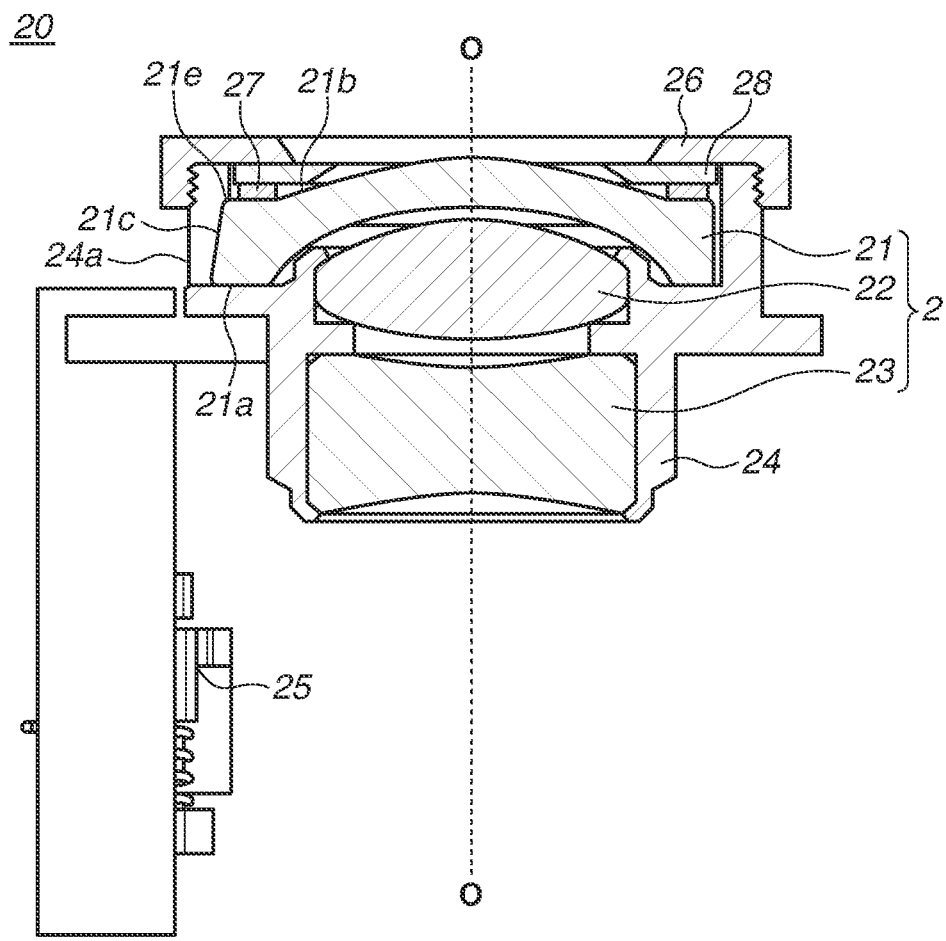
FIG. 15 is a side sectional view of the lens unit according to the sixth exemplary embodiment.

FIG. 14 is an exploded perspective view of the lens unit 20 according to the sixth exemplary embodiment. FIG. 15 is a side sectional view of the lens unit 20 according to the sixth exemplary embodiment.

The adjustment lens 21 includes three convex portions 21e. The side surface portion 21c of each of the three convex portions 21e is gradually inclined in the direction in which the side surface portion 21c is spaced apart from the optical axis O toward the first surface 21a from the second surface 21b in the direction of the optical axis O. Lens side surfaces other than the convex portions 21e are parallel to the optical axis O. There is no need to provide three convex portions 21e, as long as at least one convex portion 21e is provided. The lens side surfaces other than the convex portions 21e may be inclined with respect to the optical axis O.

The side surface portion 21c of the convex portions 21e may be parallel to the optical axis O. Alternatively, like in the fifth exemplary embodiment, the side surface portion 21c of the convex portions 21e may include the edge portion 21d.

The lens convex portions 21e are located in phase with the notch portions 24a in the rotational direction about the optical axis O. In other words, the lens convex portions 21e are provided at locations corresponding to the notch portions 24a. Each notch portion 24a is opened in the direction perpendicular to the optical axis O. In other words, each notch portion 24a is opened such that the adjustment lens 21 can be seen therethrough in the direction perpendicular to the optical axis O. Each lens convex portion 21e of the adjustment lens 21 is exposed from the corresponding notch portion 24a even in a state where the pressing member 26 is fixed to the lens holder 24.

The decentering adjustment and the holding method are similar to those in the first exemplary embodiment. There is no need to incline the lens side surfaces other than the convex portions 21e of the adjustment lens 21. Accordingly, the size of the adjustment lens 21 can be reduced in the radial direction at locations other than the convex portions 21e. Further, since the convex portions 21e are located in phase with the notch portions 24a, the shape of each convex portion 21e has no adverse effect on the size of the lens holder 24 in the radial direction. Therefore, the reduced size of the adjustment lens 21 at locations other than the convex portions 21e leads to a reduction in the size of the lens holder 24 in the radial direction.

Also, in the present exemplary embodiment, like in the first exemplary embodiment, the plate member 28 may be omitted.

Like in the second exemplary embodiment, the lens holder 24 may include the openings 24b instead of the notch portions 24a. Further, like in the third exemplary embodiment, the plate member 28 may be located between the elastic member 27 and the adjustment lens 21.

According to the present exemplary embodiment, like in the first exemplary embodiment, it is possible to provide the lens unit 20 in which a positional deviation from an adjustment position can be reduced in the case of performing the decentering adjustment of the adjustment lens 21. Further, like in the fourth exemplary embodiment, the rotation of the adjustment lens 21 can be prevented. Furthermore, the miniaturization of the lens holder 24 in the radial direction can be achieved.

The lens unit 20 according to a seventh exemplary embodiment will be described below with reference to FIGS. 16 and 17. In the present exemplary embodiment, components common to those of the first exemplary embodiment are denoted by the same reference numerals as those in the first exemplary embodiment. Descriptions of components common to those of the first exemplary embodiment are omitted. The lens unit 20 according to the seventh exemplary embodiment is different from the lens unit 20 according to the first exemplary embodiment in the shape of the adjustment lens 21.

Figure 16:
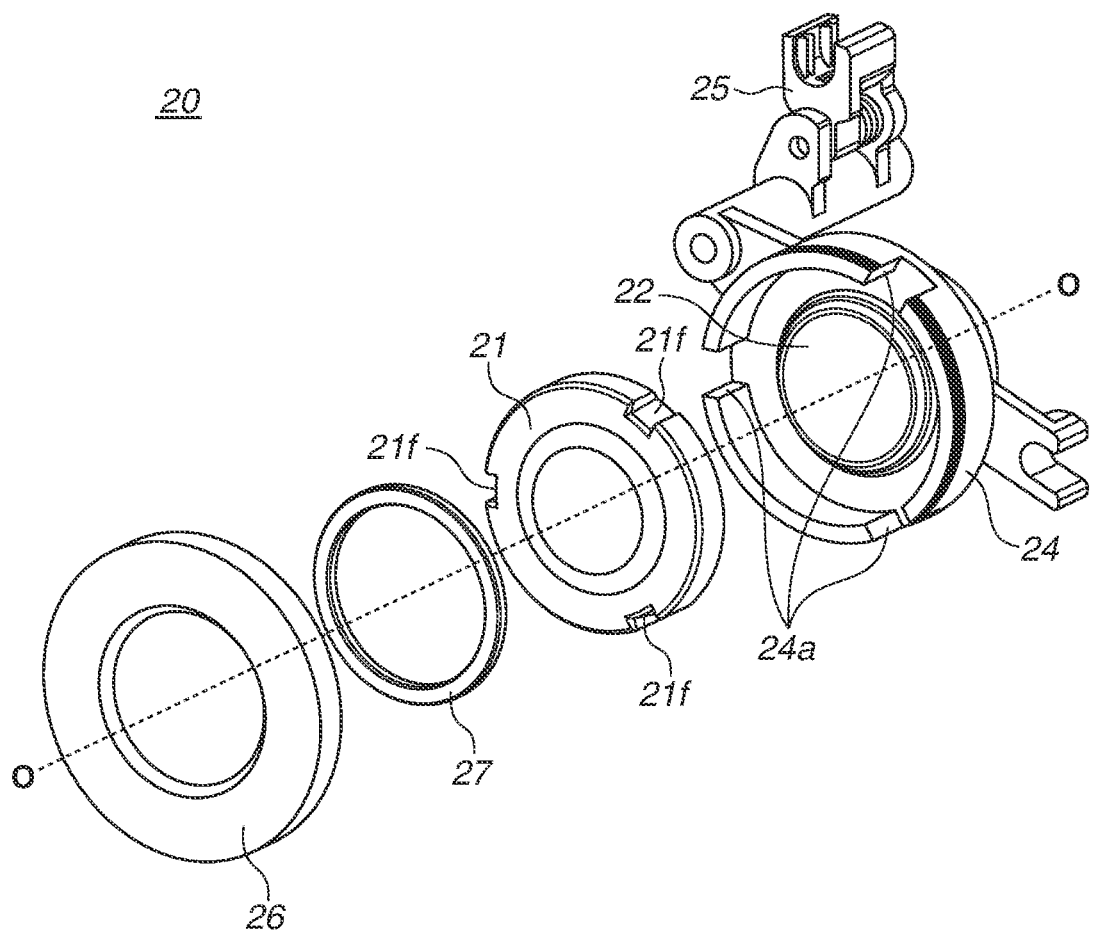
FIG. 16 is an exploded perspective view of a lens unit according to a seventh exemplary embodiment.

FIG. 16 is an exploded perspective view of the lens unit 20 according to the seventh exemplary embodiment. The adjustment lens 21 includes three concave portions 21f. The side surface portion 21c of each of the three concave portions 21f is gradually inclined in the direction in which the side surface portion 21c is spaced apart from the optical axis O toward the first surface 21a from the second surface 21b in the direction of the optical axis O. Lens side surfaces other than the concave portions 21f are parallel to the optical axis O. There is no need to provide three concave portions 21f, as long as at least one concave portion 21f is provided. The lens side surfaces other than the concave portions 21f may be inclined with respect to the optical axis O. The side surface portion 21c of each of the concave portions 21f may be in parallel with the optical axis O. Like in the fifth exemplary embodiment, the side surface portion 21c of each of the concave portions 21f may include the edge portion 21d.

The lens concave portions 21f are located in phase with the notch portions 24a in the rotation direction about the optical axis O. In other words, the lens concave portions 21f are provided at positions corresponding to the notch portions 24a. The notch portions 24a are opened in the direction perpendicular to the optical axis O. In other words, each notch portion 24a is opened such that the adjustment lens 21 can be seen therethrough in the direction perpendicular to the optical axis O. Each concave portion 21e of the adjustment lens 21 is exposed from the corresponding notch portion 24a even in a state where the pressing member 26 is fixed to the lens holder 24.

Figure 17:
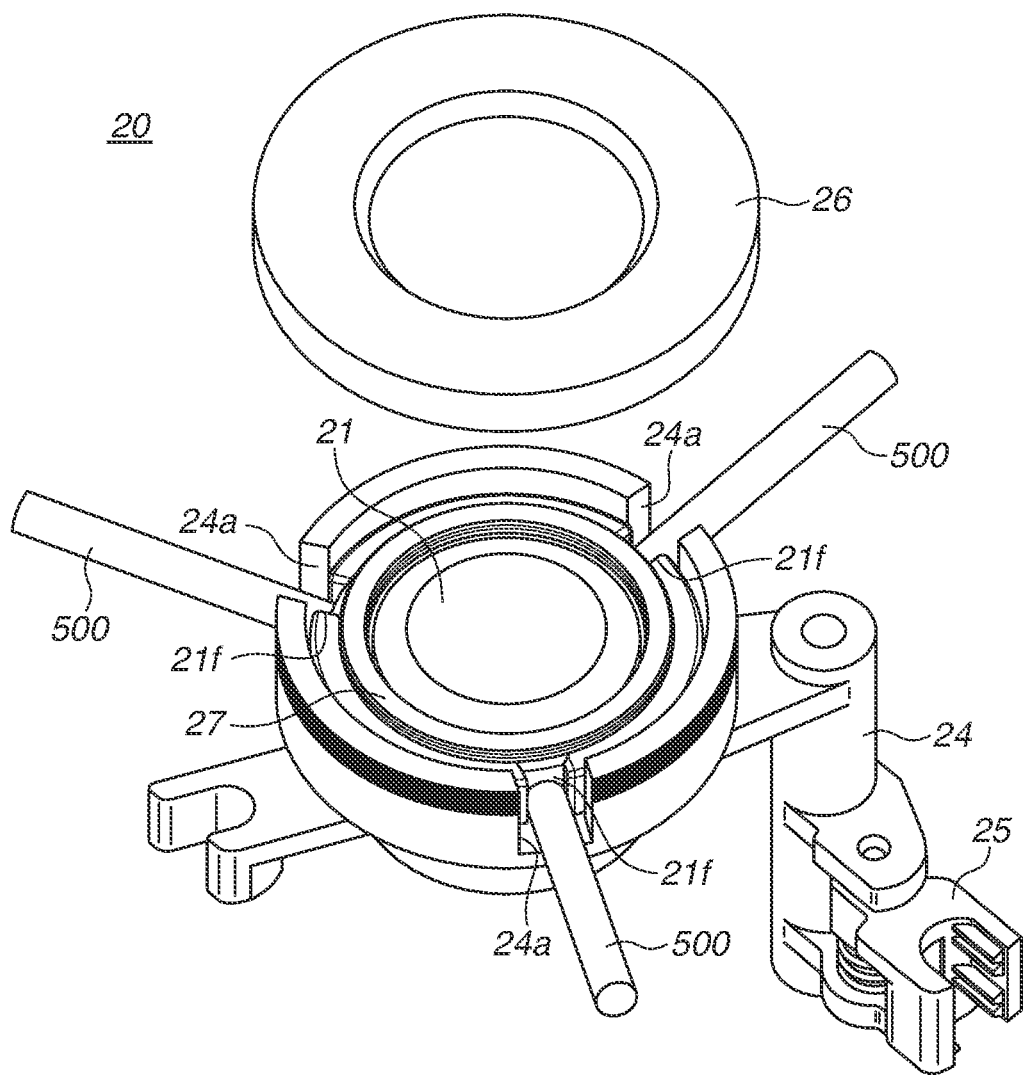
FIG. 17 is a perspective view of the lens unit according to the seventh exemplary embodiment before decentering adjustment.

FIG. 17 is a perspective view of the lens unit 20 according to the seventh exemplary embodiment before decentering adjustment.

The adjustment lens 21 is held by the lens holder 24 at the desired position obtained as a result of the decentering adjustment in the same methods as the decentering adjustment method and the holding method according to the first exemplary embodiment. At this time, the adjustment jigs 500 engage with the concave portions 21f of the adjustment lens 21. Accordingly, the adjustment jigs 500 regulate the position of the adjustment lens 21 in the rotational direction about the optical axis O, thereby preventing the rotation of the adjustment lens 21.

Also, in the present exemplary embodiment, like in the second exemplary embodiment, the lens holder 24 may include the openings 24b instead of the notch portions 24a. Further, like in the third exemplary embodiment or the fourth exemplary embodiment, the lens unit 20 according to the seventh exemplary embodiment may include the plate member 28.

According to the present exemplary embodiment, like in the first exemplary embodiment, it is possible to provide the lens unit 20 in which a positional deviation from the adjustment position can be reduced in the case of performing the decentering adjustment of the adjustment lens 21. The engagement of the adjustment jigs 500 with the concave portions 21f of the adjustment lens 21 makes it possible to prevent the rotation of the adjustment lens 21.

The lens unit 20 according to an eighth exemplary embodiment will be described below with reference to FIGS. 18 to 20. In the present exemplary embodiment, components common to those of the first exemplary embodiment may be denoted by the same reference numerals as those in the first exemplary embodiment. Descriptions of components common to those of the first exemplary embodiment are omitted. In the eighth exemplary embodiment, the pressing member 26 includes a pressing member opening 26a.

Figure 18:
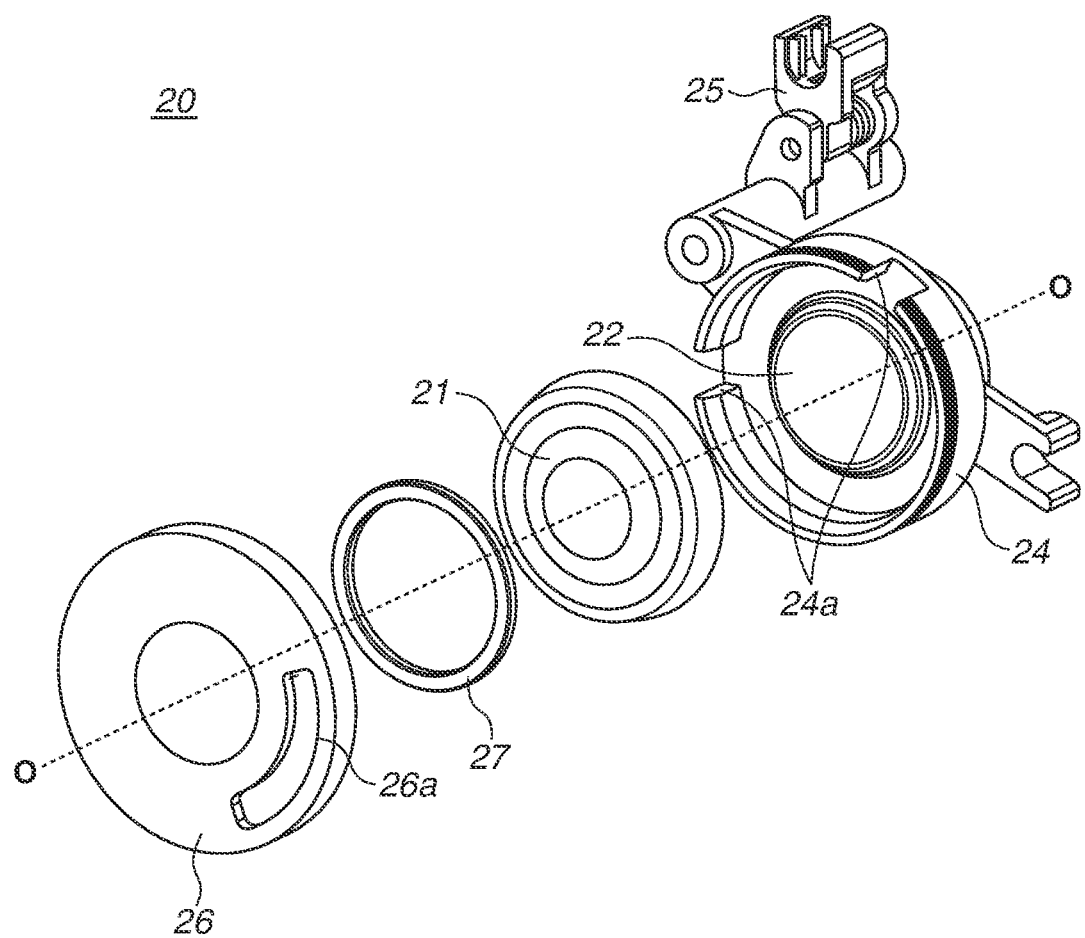
FIG. 18 is an exploded perspective view of a lens unit according to an eighth exemplary embodiment.

FIG. 18 is an exploded perspective view of the lens unit 20 according to the eighth exemplary embodiment.

The lens holder 24 includes two notch portions 24a that are opened in the direction perpendicular to the optical axis O. The notch portions 24a are opened in the direction perpendicular to the optical axis O. In other words, each notch portion 24a is opened such that the adjustment lens 21 can be seen therethrough in the direction perpendicular to the optical axis O. The side surface portion 21c of the adjustment lens 21 is exposed from the notch portions 24a even in a state where the pressing member 26 is fixed to the lens holder 24. There is no need to provide two notch portions 24a, as long as at least one notch portion 24a is provided.

The pressing member 26 includes one pressing member opening 26a. The pressing member opening 26a is opened in the direction of the optical axis O. The adjustment lens 21 is exposed through the pressing member opening 26a. The number of the pressing member openings 26a is not particularly limited, as long as at least one pressing member opening 26a is provided.

Figure 19:
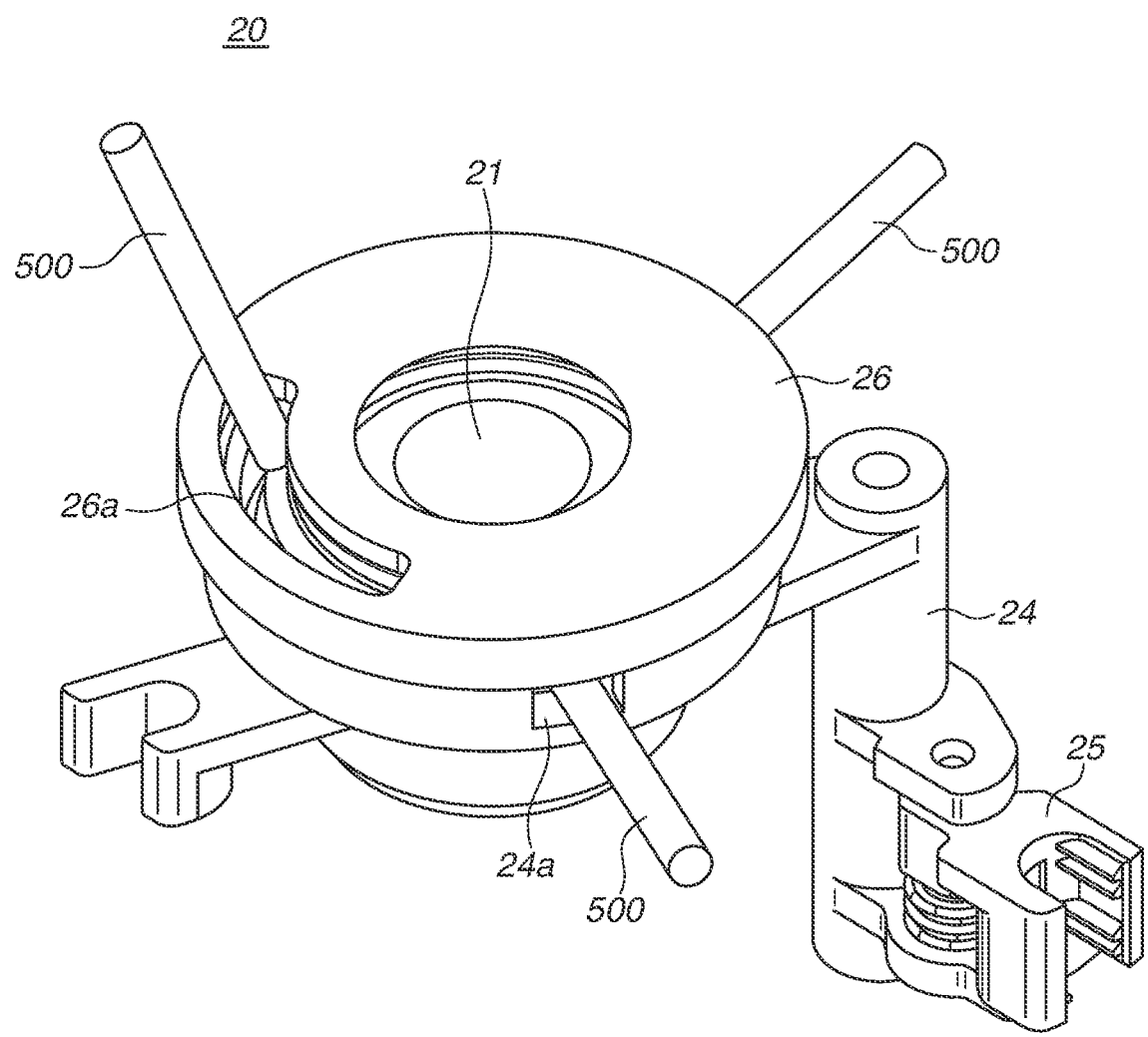
FIG. 19 is a perspective view of the lens unit according to the eighth exemplary embodiment before decentering adjustment.

FIG. 19 is a perspective view of the lens unit 20 according to the eighth exemplary embodiment before decentering adjustment.

Figure 20:
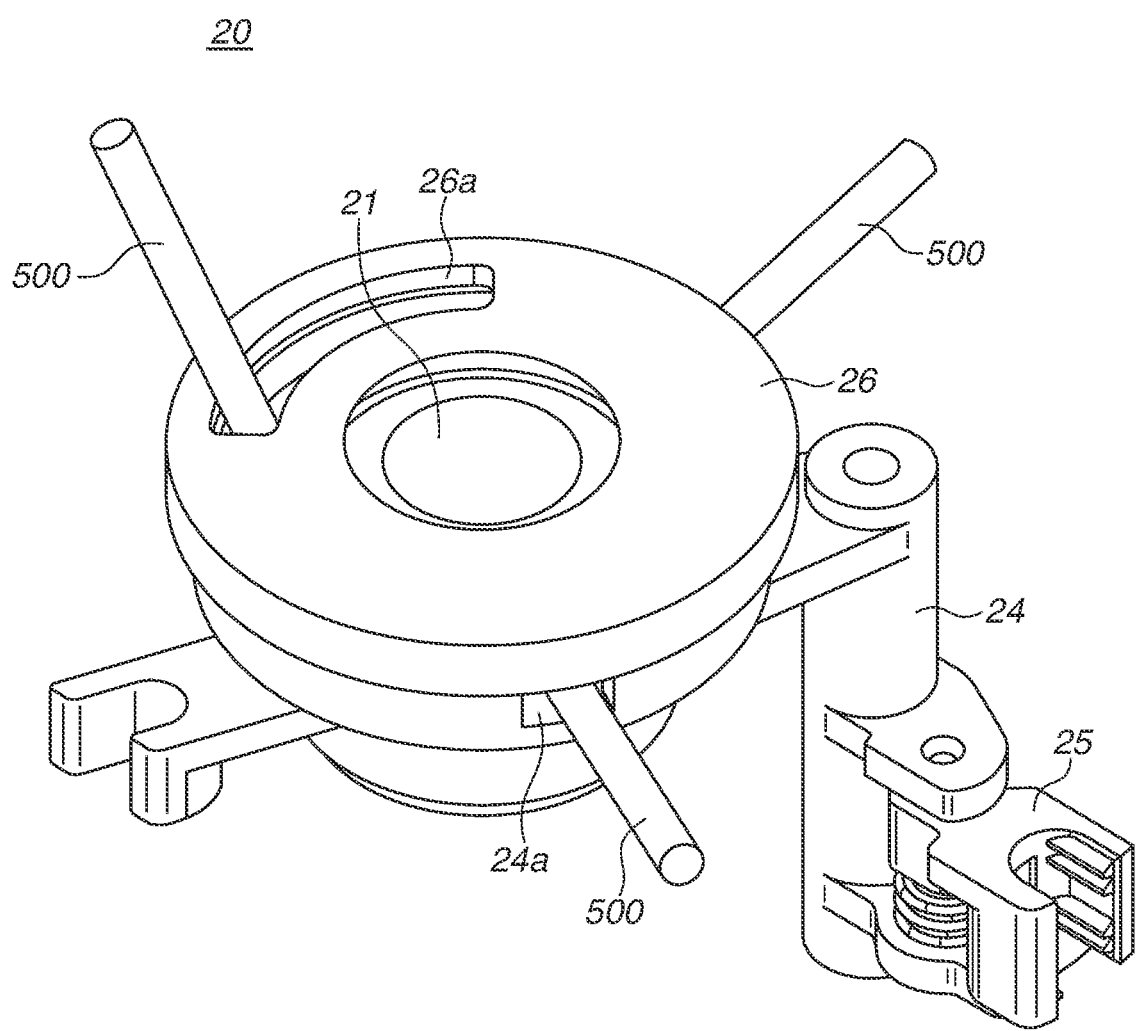
FIG. 20 is a perspective view of the lens unit according to the eighth exemplary embodiment after decentering adjustment.

FIG. 20 is a perspective view of the lens unit 20 according to the eighth exemplary embodiment after decentering adjustment.

The decentering adjustment is performed in a state where the pressing member 26 threadedly engages with the lens holder 24 to a position where the elastic member 27 is not compressed. Alternatively, the decentering adjustment may be performed in a state where the pressing member 26 threadedly engages with the lens holder 24 to a position where the elastic member 27 is compressed to such an extent that only the sliding resistance with which the decentering adjustment can be sufficiently smoothly carried out is generated and the adjustment lens 21 is urged.

The adjustment jigs 500, such as pins, are inserted into the notch portions 24a and the pressing member opening 26a, thereby pressing the side surface portion 21c of the adjustment lens 21. The decentering adjustment of the adjustment lens 21 is then performed in the same manner as in the first exemplary embodiment. The pressing member 26 threadedly engages with the lens holder 24 in a state where the decentering adjustment is completed. At this time, the pressing member 26 is rotated about the optical axis O along with the threaded engagement. However, since the pressing member opening 26a extends in the rotational direction, the pressing member 26 does not interfere with the adjustment jigs 500. This enables the pressing member 26 to threadedly engage with the lens holder 24 and to be fixed to the lens holder 24 in a state where the position of the adjustment lens 21 is regulated by the adjustment jigs 500. Further, the adjustment lens 21 is held by the lens holder 24 at the desired position obtained as a result of the decentering adjustment by the same holding method as in the first exemplary embodiment. Like in the first exemplary embodiment, the method of fixing the pressing member 26 and the lens holder 24 is not limited to threaded engagement, and the opening shape of the pressing member opening 26a is not limited to the shape described in the present exemplary embodiment.

Also, in the present exemplary embodiment, like in the second exemplary embodiment, the lens holder 24 may include the openings 24b instead of the notch portions 24a. Like in the third exemplary embodiment or the fourth exemplary embodiment, the lens unit 20 according to the eighth exemplary embodiment may include the plate member 28. Further, like in the fifth exemplary embodiment, the side surface portion 21c of the adjustment lens 21 may include the edge portion 21d. Like in the sixth exemplary embodiment, the adjustment lens 21 may include the convex portions 21e. Alternatively, like in the seventh exemplary embodiment, the adjustment lens 21 may include the concave portions 21f.

According to the present exemplary embodiment, like in the first exemplary embodiment, it is possible to provide the lens unit 20 in which a positional deviation from the adjustment position can be reduced in the case of performing the decentering adjustment of the adjustment lens 21.

Figure 21:
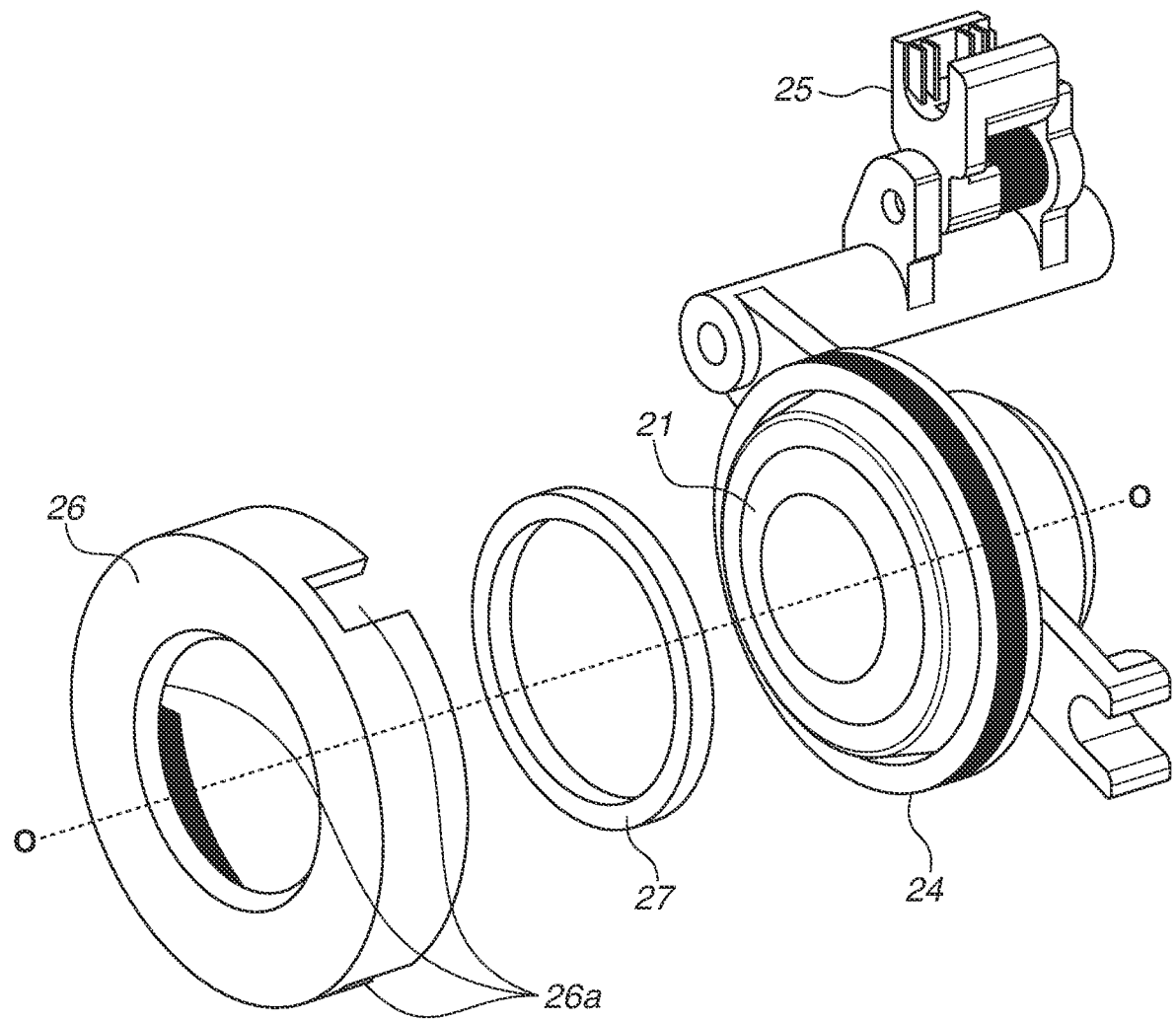
FIG. 21 is an exploded perspective view of a lens unit according to a ninth exemplary embodiment.
Figure 22:
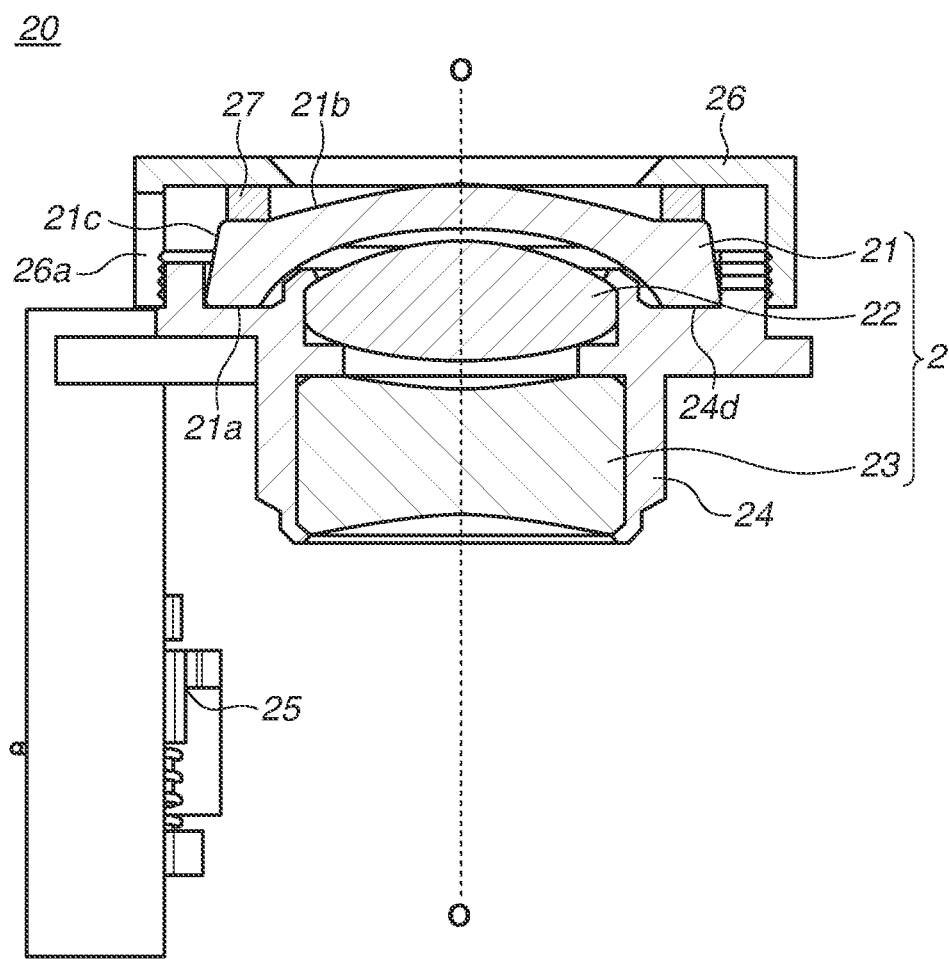
FIG. 22 is a side sectional view of the lens unit according to the ninth exemplary embodiment.

FIG. 21 is an exploded perspective view of the lens unit 20 according to a ninth exemplary embodiment. FIG. 22 is a side sectional view of the lens unit 20 according to the ninth exemplary embodiment. The lens unit 20 according to the ninth exemplary embodiment includes the second lens group 2, the lens holder 24, the second group rack 25, the pressing member 26, and the elastic member 27.

The second lens group 2 is composed of the adjustment lens 21, the lens 22, and the lens 23. The lens 22 and the lens 23 are fixed to the lens holder 24 by thermal caulking. Examples of the method of fixing the lenses 22 and 23 may include fixation by bonding with an adhesive agent and fixation by pressing with a pressing member. The fixing method is not limited to the method used in the present exemplary embodiment.

The adjustment lens 21 is a plastic lens. The adjustment lens 21 is formed by molding. The surface of the adjustment lens 21 that is in contact with the receiving surface 24d of the lens holder 24 corresponds to the first surface 21a. The surface of the adjustment lens 21 that is located on the opposite side of the first surface 21a in the direction of the optical axis O corresponds to the second surface 21b. The portion that connects the first surface 21a and the second surface 21b of the adjustment lens 21 corresponds to the side surface portion 21c. The side surface portion 21c includes a surface that is gradually inclined in the direction in which the side surface portion 21c is spaced apart from the optical axis O toward the first surface 21a from the second surface 21b in the direction of the optical axis O. The inclined surface of the side surface portion 21c need not necessarily correspond to the entire surface of the side surface portion 21c, and may correspond to only a partial area of the side surface portion 21c. Alternatively, the side surface portion 21c may be parallel to the optical axis O. The adjustment lens 21 may include a protrusion that is a gate mark formed by molding. The transmittance of light on the portion of the side surface portion 21c of the adjustment lens 21 that is exposed when the pressing member 26 is fixed to the lens holder 24, that is, the exposed portion, is represented by t1. The transmittance of light on the optical surface of the adjustment lens 21 is represented by t2. In this case, t1<t2 may be desirably satisfied. The optical surface refers to a surface through which light collected by the image capturing lens unit 200 passes when the light forms an image on the image sensor 301. In the side surface portion 21c of the adjustment lens 21, the portion that is exposed when the pressing member 26 is fixed to the lens holder 24 may be shielded from light, for example, by painting the portion in black. This prevents unwanted light that is not used for image formation, that is, so-called stray light.

The lens holder 24 is a member that holds the second lens group 2. The lens holder 24 has a substantially cylindrical shape. The lens holder 24 includes the receiving surface 24d that positions each lens. The receiving surface 24d positions the adjustment lens 21 in the direction of the optical axis O.

The second group rack 25 transmits the driving force from the second group driving portion 56 to the second lens group 2. The second group rack 25 engages with the lead screw portion of the second group driving portion 56 including the actuator such as a stepping motor.

The pressing member 26 is a member that presses the elastic member 27 and the adjustment lens 21. The pressing member 26 is in contact with the elastic member 27. The pressing member 26 has an annular shape. The pressing member 26 includes three notch portions 26a that are opened in the direction perpendicular to the optical axis O. Each notch portion 26a is a portion through which a tool for moving and adjusting the adjustment lens 21 in parallel with the receiving surface 24d of the lens holder 24 by pressing the outer peripheral surface of the adjustment lens 21 is inserted.

The notch portions 26a are provided at three locations that substantially equally divide the peripheral wall of the pressing member 26 in the circumferential direction. The notch portions 26a are opened in the direction perpendicular to the optical axis O. In other words, each notch portion 26a is opened such that the side surface portion 21c of the adjustment lens 21 can be seen therethrough in the direction perpendicular to the optical axis O. The side surface portion 21c (outer peripheral surface) of the adjustment lens 21 is exposed from the notch portions 26a even in a state where the pressing member 26 is fixed to the lens holder 24. There is no need to provide three notch portions 26a, as long as at least one notch portion 26a is provided. The pressing member 26 is fixed to the lens holder 24 using snap-fits (not illustrated).

The elastic member 27 is a member for fixing the adjustment lens 21. The elastic member 27 has an annular shape. The elastic member 27 is sandwiched and compressed between the pressing member 26 and the adjustment lens 21.

The elastic member 27 and the adjustment lens 21 are located in this order from the side of the pressing member 26 between the pressing member 26 and the lens holder 24 in the direction of the optical axis O. The pressing member 26 is fixed to the lens holder 24, thereby allowing the elastic member 27 to be sandwiched and compressed between the pressing member 26 and the adjustment lens 21. Compressing the elastic member 27 enables the elastic member 27 to urge the adjustment lens 21 against the lens holder 24 in the direction of the optical axis O, so that the adjustment lens 21 is held by the lens holder 24. Examples of the method of fixing the lens holder 24 and the pressing member 26 may also include fixation by bonding with an adhesive agent and fixation by fastening with screws. The fixing method is not limited to fixation using snap-fits.

Figure 23:
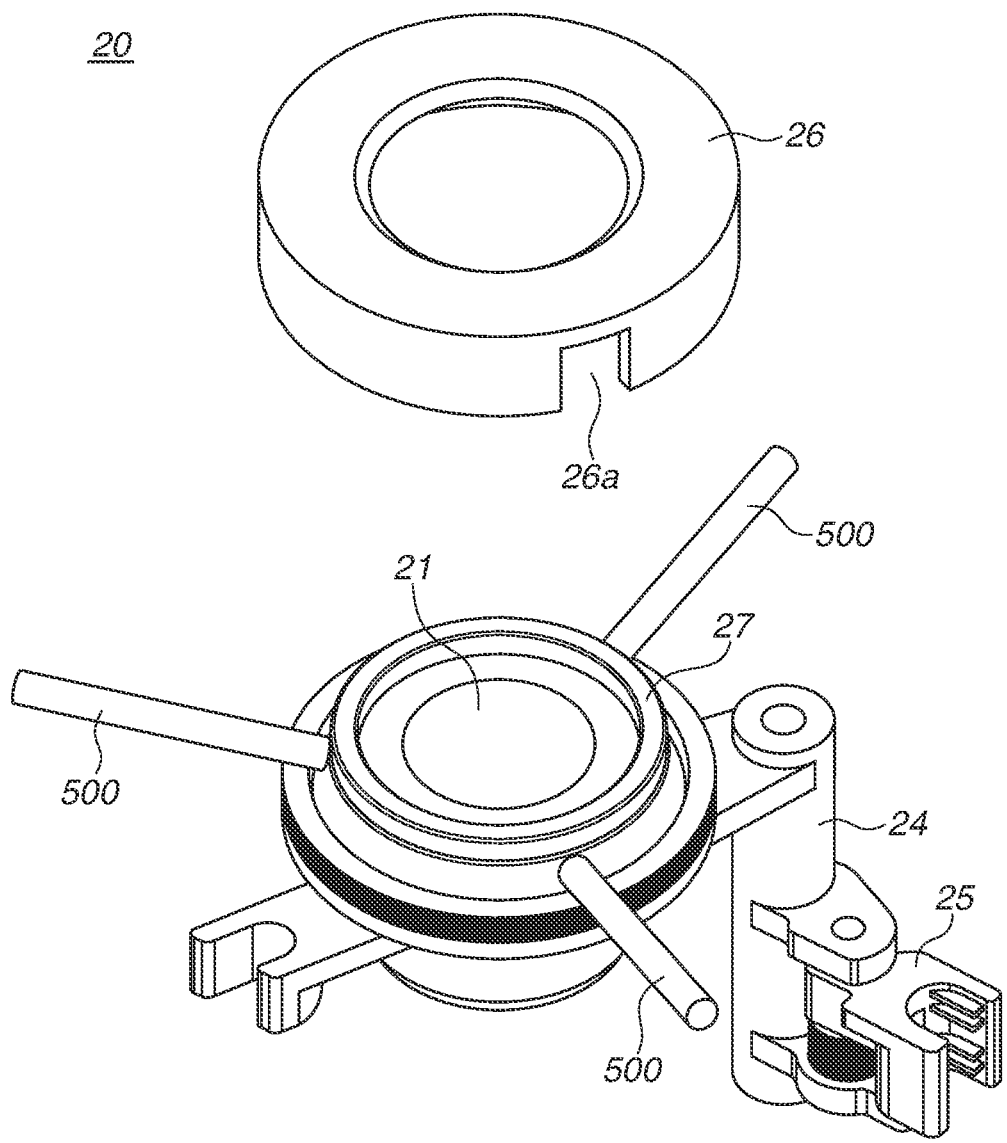
FIG. 23 is a perspective view of the lens unit according to the ninth exemplary embodiment before decentering adjustment.
Figure 24:
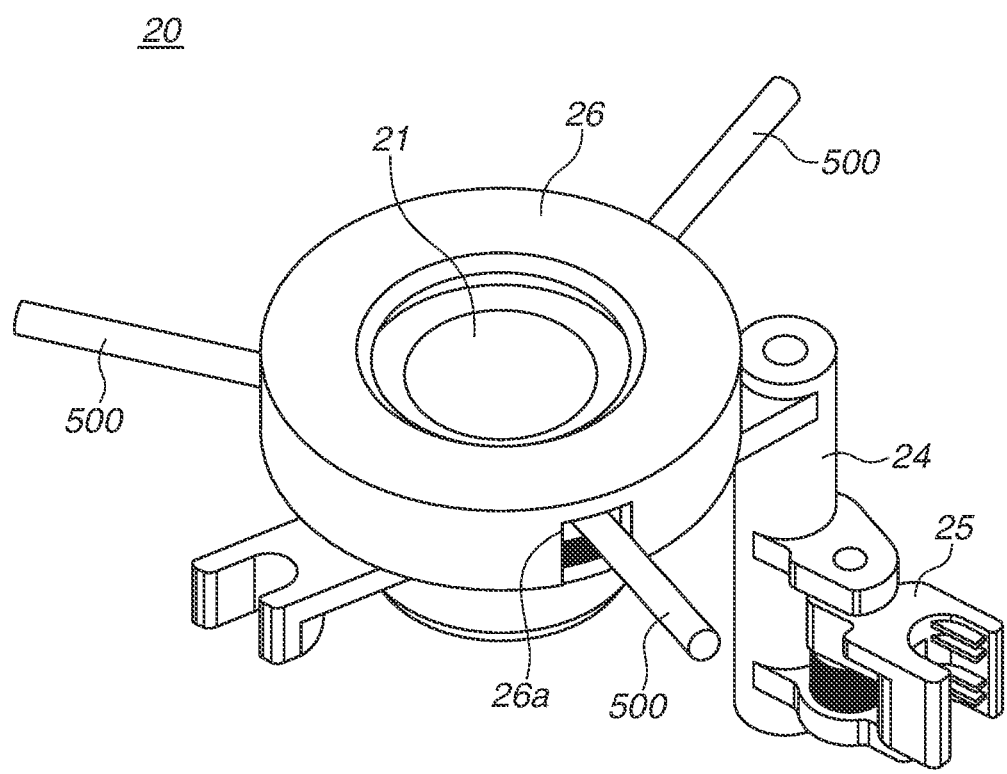
FIG. 24 is a perspective view of the lens unit according to the ninth exemplary embodiment after decentering adjustment.
Figure 25:
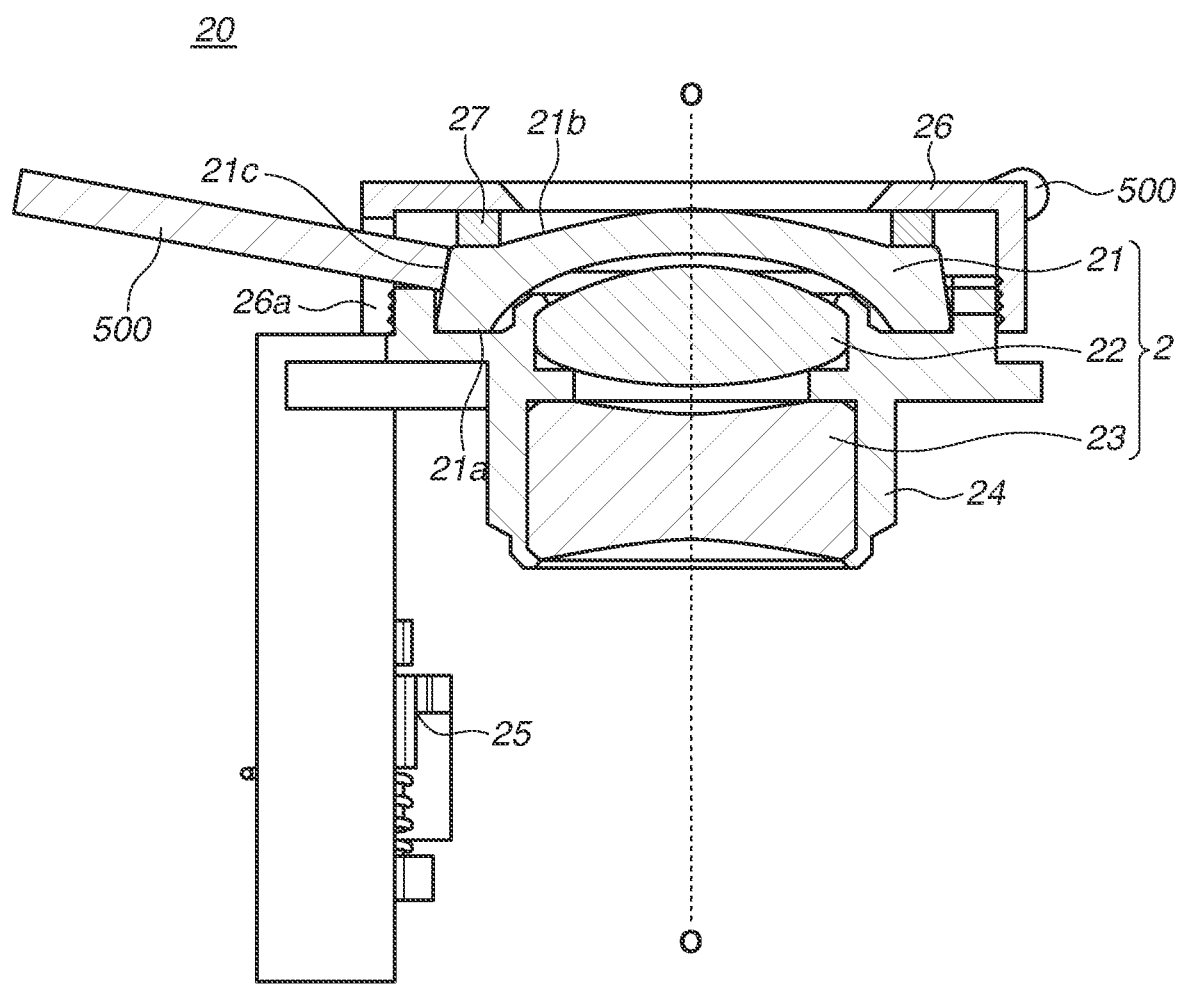
FIG. 25 is a side sectional view of the lens unit according to the ninth exemplary embodiment after decentering adjustment.

FIG. 23 is a perspective view of the lens unit 20 according to the ninth exemplary embodiment before decentering adjustment. FIG. 24 is a perspective view of the lens unit 20 according to the ninth exemplary embodiment after decentering adjustment. FIG. 25 is a side sectional view of the lens unit 20 according to the ninth exemplary embodiment after decentering adjustment.

In the case of performing the decentering adjustment of the adjustment lens 21, the adjustment jigs 500, such as pins, are inserted to press the side surface portion 21c of the adjustment lens 21 while an image is checked. The adjustment jigs 500 may be configured to, for example, adsorb the adjustment lens 21. The number of the adjustment jigs 500 is not particularly limited, as long as at least one adjustment jig 500 is provided. The adjustment jigs 500 are caused to advance or recede to move the adjustment lens 21 to a desired position in the direction perpendicular to the optical axis O with respect to the lens holder 24. At this time, the adjustment lens 21 is pressed in the direction perpendicular to the side surface portion 21c by the adjustment jigs 500, so that adjustment lens 21 is urged against the lens holder 24 in the direction of the optical axis O. This prevents lifting of the adjustment lens 21 from the lens holder 24.

During the decentering adjustment, the adjustment lens 21 is not urged by the elastic member 27, so that the decentering adjustment can be smoothly carried out in the direction perpendicular to the optical axis O. The decentering adjustment may be performed in a state where the pressing member 26 engages with the lens holder 24 to a position where the elastic member 27 is not compressed. Alternatively, the decentering adjustment may be performed in a state where the pressing member 26 engages with the lens holder 24 to a position where the elastic member 27 is compressed to such an extent that only the sliding resistance with which the decentering adjustment can be sufficiently smoothly carried out is generated and the adjustment lens 21 is urged. The decentering adjustment is performed in a state where the adjustment lens 21 is slightly urged by the elastic member 27, thereby preventing lifting of the adjustment lens 21 from the lens holder 24, regardless of the shape of the side surface portion 21c.

The pressing member 26 engages with the lens holder 24 in a state where the decentering adjustment is completed. The pressing member 26 and the lens holder 24 engage with each other by snap-fits. At this time, the position of the adjustment lens 21 is regulated by the adjustment jigs 500. This prevents the position of the adjustment lens 21 from deviating from the desired position obtained as a result of the decentering adjustment. The position of the adjustment lens 21 is regulated by the adjustment jigs 500 until the pressing member 26 is fixed to the lens holder 24. Thus, the adjustment lens 21 is held by the lens holder 24 at the desired position obtained as a result of the decentering adjustment. After holding of the adjustment lens 21 is completed, the adjustment jigs 500 are removed to complete the decentering adjustment and holding of the adjustment lens 21.

A light-shielding member or the like may be disposed on the opening of each notch portion 26a to close the opening after fixing of the adjustment lens 21 is completed.

As described above, the pressing member 26 is fixed to the lens holder 24 in a state where the decentering adjustment is completed, thereby allowing the adjustment lens 21 to be held by the lens holder 24 while the adjustment lens 21 remains at the desired position obtained as a result of the decentering adjustment. Specifically, the adjustment lens 21 can be held using a mechanical method, instead of using a bonding method, after the decentering adjustment of the adjustment lens 21 is performed. Consequently, a positional deviation from the lens adjustment position can be reduced in a high-temperature or low-temperature environment. Thus, according to the present exemplary embodiment, it is possible to provide the lens unit 20 in which a positional deviation from the adjustment position can be reduced in the case of performing the decentering adjustment of the adjustment lens 21.

Further, since the adjustment lens 21 can be held by the lens holder 24 due to the urging force in the direction of the optical axis O, the adjustment lens 21 receives no load in the direction perpendicular to the optical axis O, and thus the optical surface is less likely to be distorted. Furthermore, the elastic member 27 urges the surface of the adjustment lens 21 with a substantially equal force, thereby preventing the stress from being concentrated on a part of the adjustment lens 21. Accordingly, the stress applied to the adjustment lens 21 can be distributed even when the adjustment lens 21 is urged with a force required for holding the adjustment lens 21, thereby reducing the distortion of the optical surface.

The lens unit 20 according to a tenth exemplary embodiment will be described below with reference to FIG. 26. In the present exemplary embodiment, components common to those of the ninth exemplary embodiment are denoted by the same reference numerals as those in the ninth exemplary embodiment. Descriptions of items common to those in the ninth exemplary embodiment are omitted. While the pressing member 26 is provided with the notch portions 26a in the ninth exemplary embodiment, the pressing member 26 according to the tenth exemplary embodiment is provided with openings 26b (through-holes).

Figure 26:
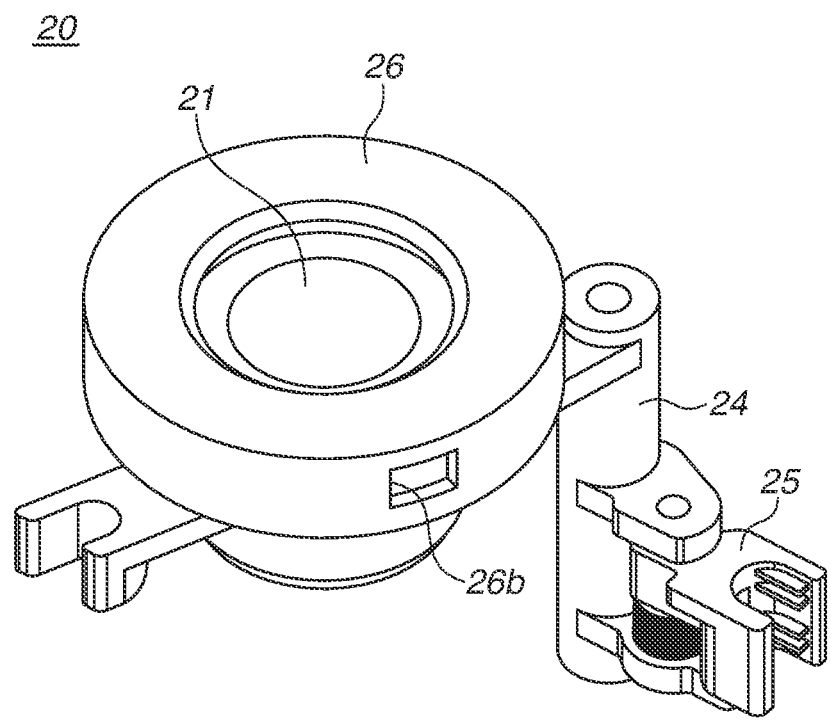
FIG. 26 is a perspective view of the lens unit according to a tenth exemplary embodiment.

FIG. 26 is a perspective view of the lens unit 20 according to the tenth exemplary embodiment. The pressing member 26 is a member that presses the elastic member 27 and the adjustment lens 21. The pressing member 26 has a substantially annular shape. The pressing member 26 includes three openings 26b (through-holes) opened in the direction perpendicular to the optical axis O. Each opening 26b is an opening through which a tool for moving and adjusting the adjustment lens 21 in parallel with the receiving surface 24d of the lens holder 24 by pressing the outer peripheral surface of the adjustment lens 21 is inserted. The openings 26b are provided at three locations that substantially equally divide the peripheral wall of the pressing member 26 in the circumferential direction. Each opening 26b penetrates through a side surface of the pressing member 26. Each opening 26b is opened in the direction perpendicular to the optical axis O. In other words, each opening 26b is opened such that the side surface portion 21c of the adjustment lens 21 can be seen therethrough in the direction perpendicular to the optical axis O. The side surface portion 21c (outer peripheral surface) of the adjustment lens 21 is exposed from the openings 26b even in a state where the pressing member 26 is fixed to the lens holder 24. There is no need to provide three openings 26b, as long as at least one opening 26b is provided.

The decentering adjustment and the holding method are similar to those in the ninth exemplary embodiment.

According to the present exemplary embodiment, the size of each opening can be reduced as compared to the first exemplary embodiment, and a reduction in the strength of the pressing member 26 can be prevented. According to the present exemplary embodiment, like in the ninth exemplary embodiment, it is possible to provide the lens unit 20 in which a positional deviation from the adjustment position can be reduced in the case of performing the decentering adjustment of the adjustment lens 21.

The lens unit 20 according to an eleventh exemplary embodiment will be described below with reference to FIGS. 27 and 28. In the present exemplary embodiment, components common to those of the ninth exemplary embodiment are denoted by the same reference numerals as those in the ninth exemplary embodiment. Descriptions of items common to those in the first exemplary embodiment are omitted. The shape of each opening 26c in the eleventh exemplary embodiment is different from the shape of the notch portions 24a in the first exemplary embodiment and the shape of the openings 24b in the second exemplary embodiment.

Figure 27:
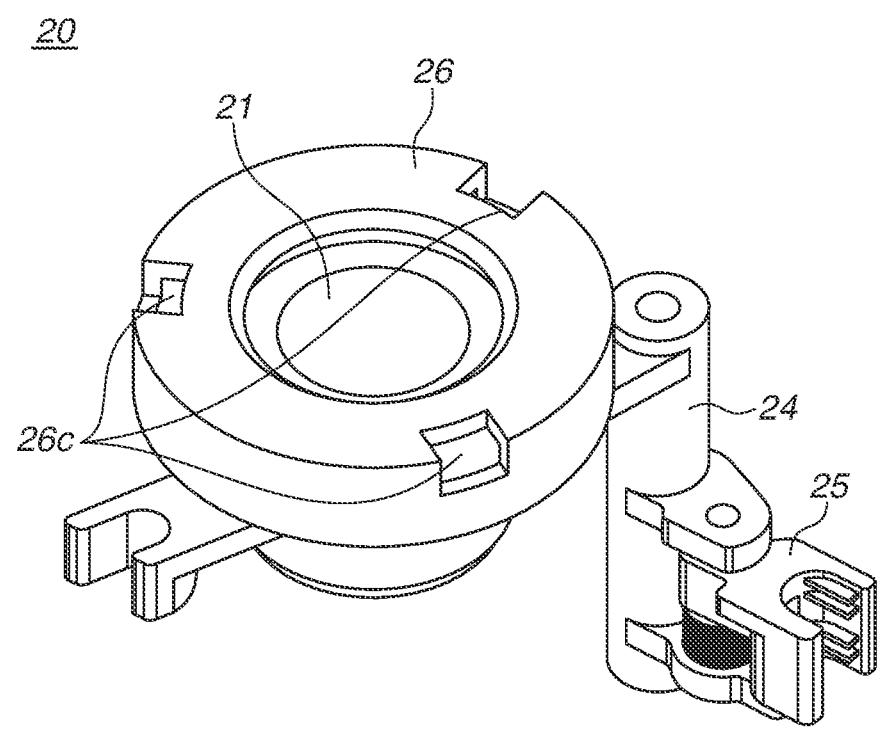
FIG. 27 is a perspective view of the lens unit according to an eleventh exemplary embodiment.
Figure 28:
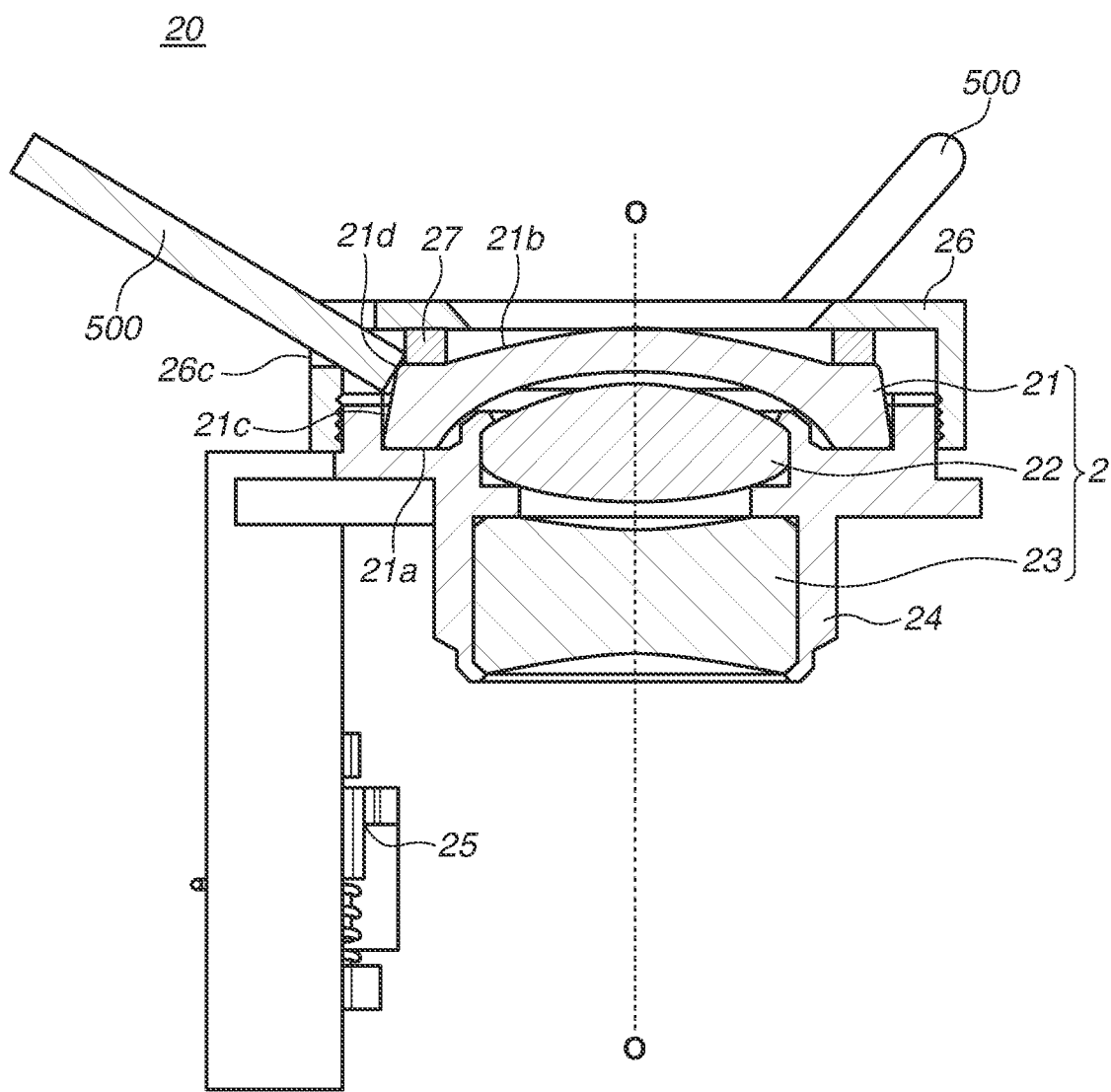
FIG. 28 is a side sectional view of the lens unit according to the eleventh exemplary embodiment during decentering adjustment.

FIG. 27 is a perspective view of the lens unit 20 according to the eleventh exemplary embodiment. FIG. 28 is a side sectional view of the lens unit 20 according to the eleventh exemplary embodiment during decentering adjustment.

The pressing member 26 is a member that presses the elastic member 27 and the adjustment lens 21. The pressing member 26 has a substantially cylindrical shape. The pressing member 26 includes three openings 26c (through-holes) opened in the direction perpendicular to the optical axis O and in the direction of the optical axis O. Specifically, each opening 26c is formed across a side surface of the pressing member 26 and an object side surface of the pressing member 26. The term "side surface" used herein refers to a portion of the pressing member 26 that has a substantially cylindrical shape and surrounds the optical axis O. The term "object side surface" refers to a portion that is formed in a substantially annular shape as a surface perpendicular to the optical axis O. The side surface and the object side surface are substantially perpendicular to each other and are connected. While FIGS. 27 and 28 illustrate each opening 26c as an example of the opening shape, a notch shape with an opening extending to an outer edge on the side where the lens holder 24 is located may be used.

Each opening 26c is an opening through which a tool for moving and adjusting the adjustment lens 21 in parallel with the receiving surface 24d of the lens holder 24 by pressing the outer peripheral surface of the adjustment lens 21 is inserted. The openings 26c are provided at three locations that substantially equally divide the peripheral wall of the pressing member 26 in the circumferential direction. A part of the adjustment lens 21 is exposed from each openings 26c. The side surface portion 21c (outer peripheral surface) of the adjustment lens 21 is exposed from the openings 26c even in a state where the pressing member 26 is fixed to the lens holder 24. There is no need to provide three openings 26c, as long as at least one opening 26c is provided.

The adjustment lens 21 includes the edge portion (connecting portion) 21d between the side surface portion 21c and the second surface 21b. The edge portion 21d may have an edge shape, a chamfered shape, or an R-shape. At least a part of the edge portion 21d of the adjustment lens 21 is exposed from the openings 26c of the pressing member 26 even in a state where the pressing member 26 is fixed to the lens holder 24.

When the decentering adjustment of the adjustment lens 21 is performed, the adjustment jigs 500, such as pins, are inserted into the openings 26c of the pressing member 26, thereby pressing the edge portion 21d of the adjustment lens 21. At this time, the adjustment jigs 500 press the edge portion 21d not in the direction perpendicular to the optical axis O, but in the direction toward the lens holder 24. This enables the adjustment lens 21 to be urged against the lens holder 24 in the direction of the optical axis O, thereby preventing lifting of the adjustment lens 21 from the lens holder 24. The other processes in the decentering adjustment and the holding method are similar to those in the first exemplary embodiment.

According to the present exemplary embodiment, the adjustment lens 21 can be prevented from being lifted from the lens holder 24 without forming the side surface portion 21c to be inclined with respect to the optical axis O. This prevents an increase in the size of the adjustment lens 21 and the lens unit 20 in the radial direction. Like in the first exemplary embodiment, it is possible to provide the lens unit 20 in which a positional deviation from the adjustment position can be reduced in the case of performing the decentering adjustment of the adjustment lens 21.

The lens unit 20 according to a twelfth exemplary embodiment will be described below with reference to FIGS. 29 and 30. In the present exemplary embodiment, components common to those of the ninth exemplary embodiment are denoted by the same reference numerals as those in the ninth exemplary embodiment. Descriptions of items common to those in the ninth and tenth exemplary embodiments are omitted. The size of each opening 26b of the pressing member 26 and the method of fixing the pressing member 26 to the lens holder 24 in the twelfth exemplary embodiment are different from those in the tenth exemplary embodiment.

Figure 29:
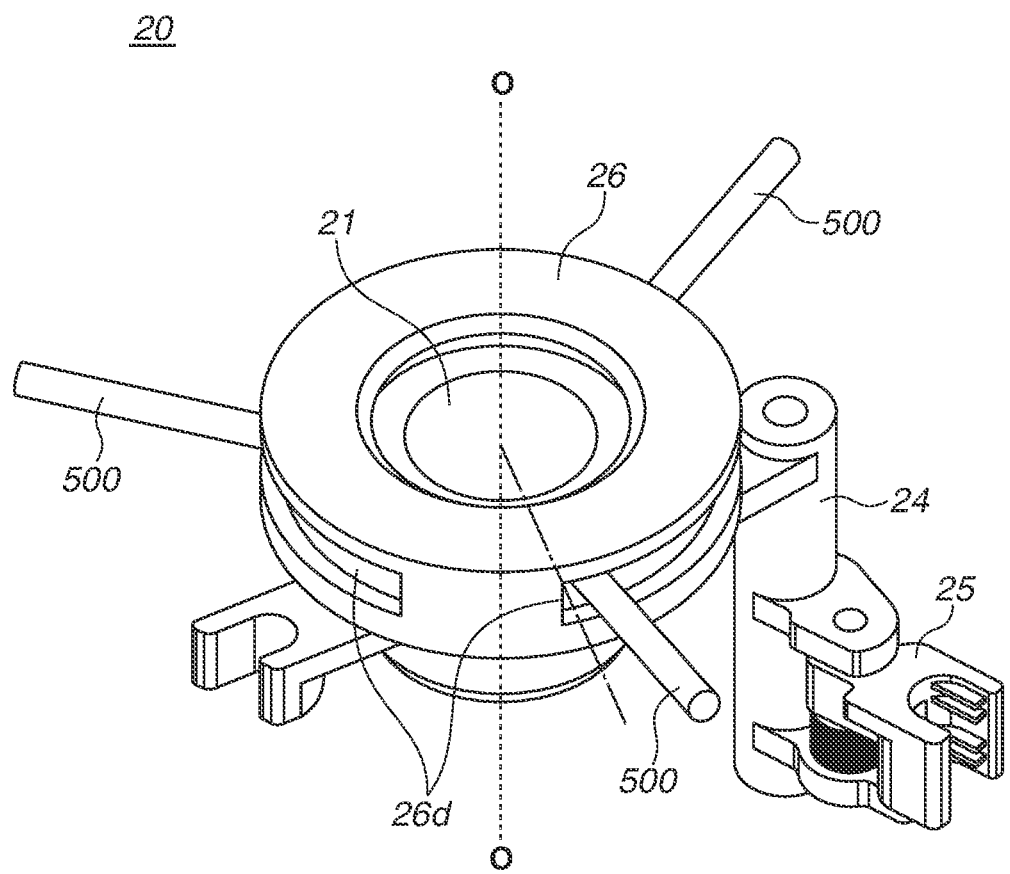
FIG. 29 is a perspective view of the lens unit according to a twelfth exemplary embodiment before decentering adjustment.
Figure 30:
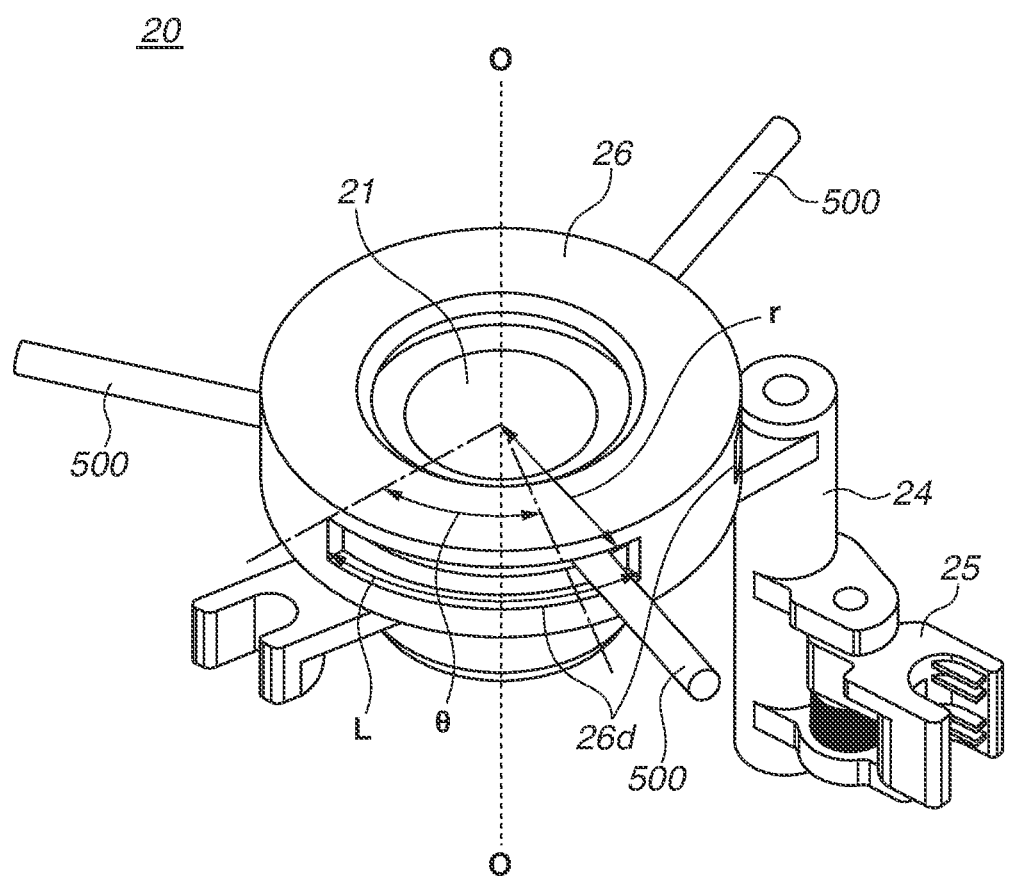
FIG. 30 is a perspective view of the lens unit according to the twelfth exemplary embodiment during decentering adjustment.

FIG. 29 is a perspective view of the lens unit 20 according to the twelfth exemplary embodiment during decentering adjustment. FIG. 30 is a side sectional view of the lens unit 20 according to the twelfth exemplary embodiment after decentering adjustment.

The pressing member 26 includes three openings 26d. The openings 26d are opened in the direction perpendicular to the optical axis O. While FIGS. 29 and 30 illustrate each opening 26d as an example of the opening shape, a notch shape with an opening extending to an outer edge on the side where the lens holder 24 is located may be used. Each opening 26d extends in the direction of the outer peripheral surface of the pressing member 26. Assume that the distance to each opening 26d from the optical axis O of the adjustment lens 21 is represented by "r", the angle at which the pressing member 26 is rotated in the direction of the optical axis O with respect to the lens holder 24 when the pressing member 26 is fixed to the lens holder 24 is represented by "θ", and the size (arc length) of each opening 26d is represented by "L". In this case, the relationship of L>rθ is satisfied.

The lens holder 24 and the pressing member 26 each include a screw portion (not illustrated). In the present exemplary embodiment, the screw portion included in the pressing member 26 engages with the screw portion included in the lens holder 24, thereby fixing the pressing member 26 to the lens holder 24.

The decentering adjustment and the holding method for the adjustment lens 21 will be described below. First, the pressing member 26 engages with the lens holder 24 with screws to temporarily fix the pressing member 26 to the lens holder 24 to a position where the elastic member 27 is not compressed, or to a position where the elastic member 27 is compressed to such an extent that only the sliding resistance with which the decentering adjustment can be sufficiently smoothly carried out is generated. Next, at least one adjustment jig 500, such as a pin, is inserted into the openings 26d of the pressing member 26. Further, the adjustment jig 500 presses or adsorbs the side surface portion 21c of the adjustment lens 21 to cause the side surface portion 21c of the adjustment lens 21 to advance or recede, thereby moving the adjustment lens 21 to a desired position in the direction perpendicular to the optical axis O with respect to the lens holder 24.

In a state where the decentering adjustment is completed, the pressing member 26 is rotated to firmly engage with the lens holder 24 using screws, thereby fixing the lens holder 24 to the pressing member 26.

It is desirable to satisfy $\mu1<\mu6$ or $\mu2<\mu6$ where "$\mu1$" represents a friction coefficient between the elastic member 27 and the pressing member 26, "$\mu2$" represents a friction coefficient between the elastic member 27 and the adjustment lens 21, and "$\mu6$" represents a friction coefficient between the adjustment lens 21 and the lens holder 24. Satisfying this relationship enables the elastic member 27 to slide to prevent the rotation of the adjustment lens 21 even in a case where a load is generated in the direction of the optical axis O when the pressing member 26 engages with the lens holder 24 with screws.

As long as the relationship of $\mu1<\mu6$ or $\mu2<\mu6$ is satisfied, the pressing member 26 can be fixed while the desired lens adjustment state is maintained even in a case where the pressing member 26 engages with the lens holder 24 with screws in a state where the adjustment jigs 500 are separated from the adjustment lens 21 after the decentering adjustment is completed. Like in the first exemplary embodiment, it is possible to provide the lens unit 20 in which a positional deviation from the adjustment position can be reduced in the case of performing the decentering adjustment of the adjustment lens 21.

The lens unit 20 according to a thirteenth exemplary embodiment will be described below with reference to FIGS. 31 and 32. In the present exemplary embodiment, components common to those of the ninth exemplary embodiment are denoted by the same reference numerals as those in the ninth exemplary embodiment. Descriptions of components common to those of the ninth exemplary embodiment are omitted. The lens unit 20 according to the thirteenth exemplary embodiment includes the plate member 28.

Figure 31:
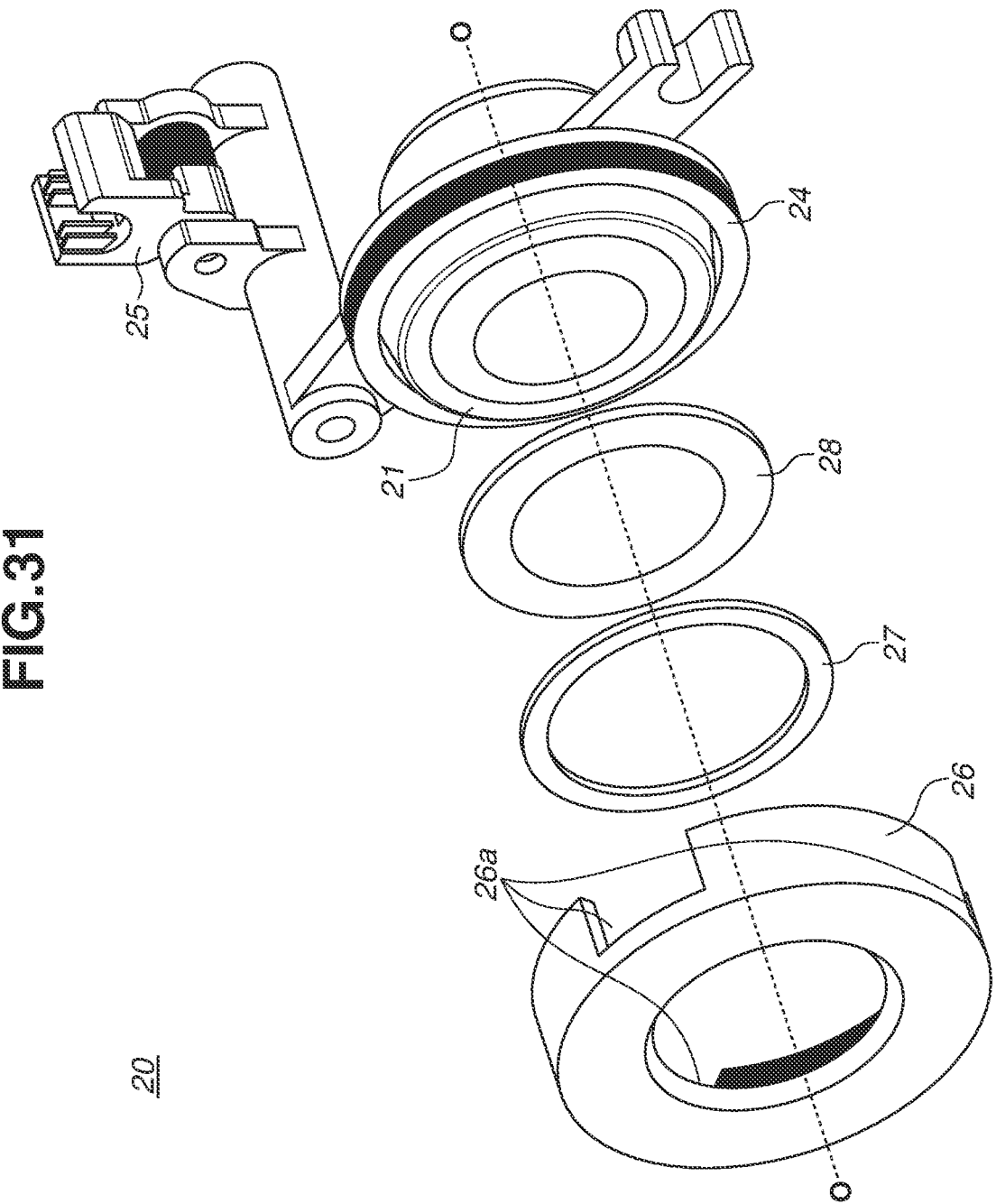
FIG. 31 is an exploded perspective view of a lens unit according to a thirteenth exemplary embodiment.
Figure 32:
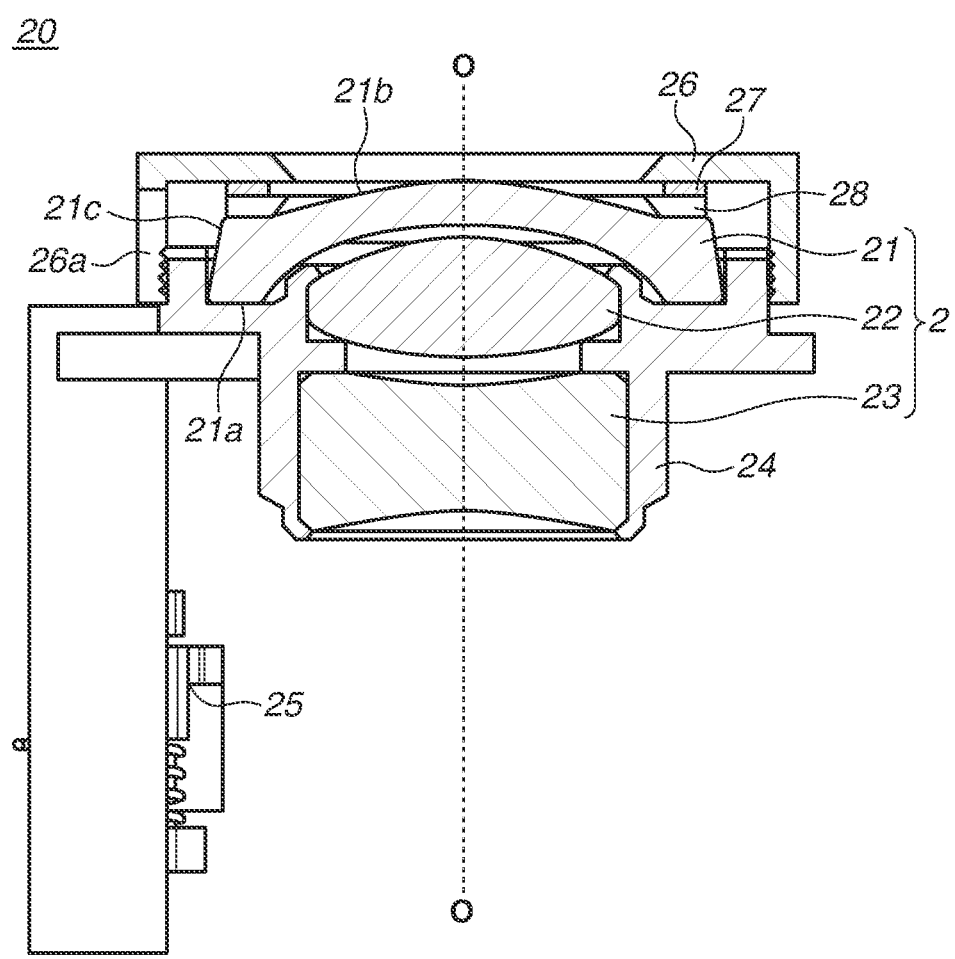
FIG. 32 is a side sectional view of the lens unit according to the thirteenth exemplary embodiment.

FIG. 31 is an exploded perspective view of the lens unit 20 according to the thirteenth exemplary embodiment. FIG. 32 is a side sectional view of the lens unit 20 according to the thirteenth exemplary embodiment.

The lens unit 20 according to the thirteenth exemplary embodiment includes the second lens group 2, the lens holder 24, the second group rack 25, the pressing member 26, the elastic member 27, and the plate member 28.

The elastic member 27, the plate member 28, and the adjustment lens 21 are located in this order from the side of the pressing member 26 between the pressing member 26 and the lens holder 24 in the direction of the optical axis O. The pressing member 26 is fixed to the lens holder 24, thereby allowing the elastic member 27 to be sandwiched and compressed between the pressing member 26 and the plate member 28. Compressing the elastic member 27 enables the elastic member 27 to urge the adjustment lens 21 against the lens holder 24 together with the plate member 28 in the direction of the optical axis O, so that the adjustment lens 21 is held by the lens holder 24.

The decentering adjustment and the holding method are similar to those in the first exemplary embodiment. It is desirable to satisfy $\mu1<\mu6$, $\mu3<\mu6$, or $\mu4<\mu6$ where "$\mu1$" represents a friction coefficient between the elastic member 27 and the pressing member 26, "$\mu3$" represents a friction coefficient between the elastic member 27 and the plate member 28, "$\mu4$" represents a friction coefficient between the plate member 28 and the adjustment lens 21, and "$\mu6$" represents a friction coefficient between the adjustment lens 21 and the lens holder 24. Satisfying this relationship enables the elastic member 27 or the plate member 28 to slide to prevent the rotation of the adjustment lens 21 even in a case where a load is generated in the rotational direction of the optical axis O when the pressing member 26 threadedly engages with the lens holder 24.

Also, in the present exemplary embodiment, like in the tenth exemplary embodiment, the lens holder 24 may include the openings 24b instead of the notch portions 24a.

According to the present exemplary embodiment, like in the ninth exemplary embodiment, it is possible to provide the lens unit 20 in which a positional deviation from the adjustment position can be reduced in the case of performing the decentering adjustment of the adjustment lens 21. Further, the rotation of the adjustment lens 21 can be prevented due to sliding of the plate member 28 even in a case where the elastic member 27 is made of a material that is less likely to slide.

The lens unit 20 according to a fourteenth exemplary embodiment will be described below with reference to FIG. 33. In the present exemplary embodiment, components common to those of the ninth exemplary embodiment are denoted by the same reference numerals as those in the ninth exemplary embodiment. Descriptions of components common to those of the ninth exemplary embodiment are omitted. Like in the thirteenth exemplary embodiment, the lens unit 20 according to the fourteenth exemplary embodiment includes the plate member 28, and the plate member 28 also functions as the fixed diaphragm. The fourteenth exemplary embodiment also differs from the thirteenth exemplary embodiment in the layout of the plate member 28 and the elastic member 27.

Figure 33:
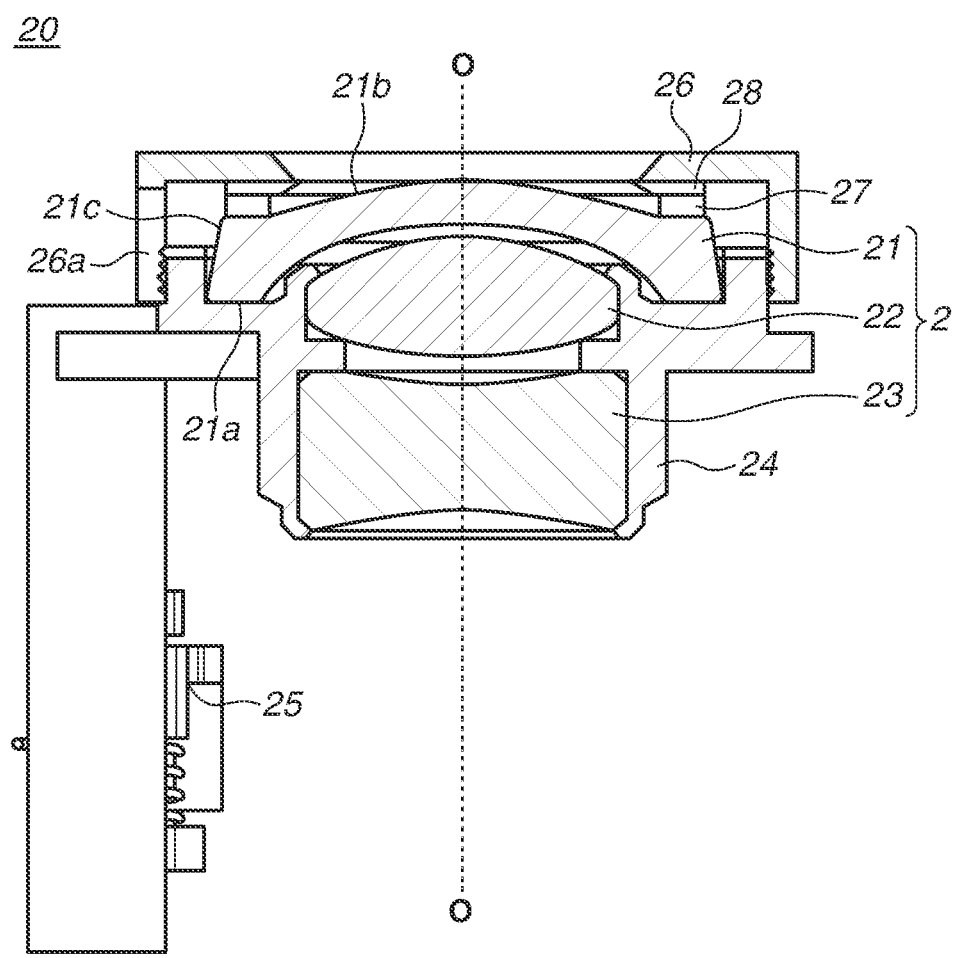
FIG. 33 is a side sectional view of a lens unit according to a fourteenth exemplary embodiment.

FIG. 33 is a side sectional view of the lens unit 20 according to the fourteenth exemplary embodiment.

The plate member 28 functions as the fixed diaphragm and prevents unwanted light from entering the adjustment lens 21. The plate member 28 has the light-shielding function. The plate member 28, the elastic member 27, and the adjustment lens 21 are located in this order from the side of the pressing member 26 between the pressing member 26 and the lens holder 24 in the direction of the optical axis O. The pressing member 26 threadedly engages with the lens holder 24 and is fixed to the lens holder 24, thereby allowing the elastic member 27 to be sandwiched and compressed between the plate member 28 and the adjustment lens 21. Compressing the elastic member 27 enables the elastic member 27 to urge the adjustment lens 21 against the lens holder 24 in the direction of the optical axis O, so that the adjustment lens 21 is held by the lens holder 24.

The decentering adjustment and the holding method are similar to those in the ninth exemplary embodiment. It is desirable to satisfy $\mu 2<\mu 6$, $\mu 3<\mu 6$, or $\mu 5<\mu 6$ where "$\mu 2$" represents a friction coefficient between the elastic member 27 and the adjustment lens 21, "$\mu 3$" represents a friction coefficient between the elastic member 27 and the plate member 28, "$\mu 5$" represents a friction coefficient between the plate member 28 and the pressing member 26, and "$\mu 6$" represents a friction coefficient between the adjustment lens 21 and the lens holder 24. Satisfying this relationship enables the elastic member 27 or the plate member 28 to slide to prevent the rotation of the adjustment lens 21 even in a case where a load is generated in the rotational direction about the optical axis O when the pressing member 26 threadedly engages with the lens holder 24.

Also, in the present exemplary embodiment, like in the tenth exemplary embodiment, the pressing member 26 may include the openings 26b instead of the notch portions 26a.

According to the present exemplary embodiment, like in the ninth exemplary embodiment, it is possible to provide the lens unit 20 in which a positional deviation from the adjustment position can be reduced in the case of performing the decentering adjustment of the adjustment lens 21. Further, like in the third exemplary embodiment, the rotation of the adjustment lens 21 can be prevented. Furthermore, the plate member 28 functions as the fixed diaphragm, which leads to a reduction in the number of components.

While various exemplary embodiments of the present disclosure are described above, the present disclosure is not limited to the above-described exemplary embodiments. The exemplary embodiments of the present disclosure can be modified and changed in various forms within the scope of the disclosure. Further, as long as the design function is considered, the present disclosure is not limited to a particular configuration.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2022-098473, filed Jun. 17, 2022, and No. 2022-098475, filed Jun. 17, 2022, which are hereby incorporated by reference herein in their entirety.

What is claimed is:

1. A lens unit that fixes and holds a lens after the lens is moved and adjusted in parallel with a receiving surface, the lens unit comprising:
    a lens holder configured to hold the lens, the lens holder including the receiving surface;
    a pressing member configured to be fixed to the lens holder; and
    an elastic member configured to press the lens against the lens holder, the elastic member being located between the pressing member and the lens,
    wherein the lens holder includes an opening through which a tool for moving and adjusting the lens in parallel with the receiving surface by pressing an outer peripheral surface of the lens is inserted,
    wherein a position of the lens is fixed by the pressing member and the elastic member, and
    wherein the outer peripheral surface of the lens is inclined such that the outer peripheral surface is gradually spaced apart from an optical axis of the lens toward a surface of the lens that is in contact with the lens holder.

2. The lens unit according to claim 1, wherein the opening is one of a through-hole and a notch.

3. The lens unit according to claim 1, wherein the opening is provided on a side surface of the lens holder.

4. The lens unit according to claim 1, wherein the pressing member threadedly engages with the lens holder and is fixed to the lens holder.

5. The lens unit according to claim 1, further comprising a plate member,
    wherein the plate member is located between the lens and the elastic member.

6. The lens unit according to claim 5, wherein at least one of the following conditions is satisfied:
    $\mu 1<\mu 6$;
    $\mu 3<\mu 6$; or
    $\mu 4<\mu 6$
    where "$\mu 1$" represents a friction coefficient between the elastic member and the pressing member, "$\mu 3$" represents a friction coefficient between the elastic member and the plate member, "$\mu 4$" represents a friction coefficient between the plate member and the lens, and "$\mu 6$" represents a friction coefficient between the lens and the lens holder.

7. The lens unit according to claim 1, further comprising a plate member,
    wherein the plate member is located between the pressing member and the elastic member.

8. The lens unit according to claim 7, wherein at least one of the following conditions is satisfied:
    $\mu 2<\mu 6$;
    $\mu 3<\mu 6$; or
    $\mu 5<\mu 6$
    where "$\mu 2$" represents a friction coefficient between the elastic member and the lens, "$\mu 3$" represents a friction coefficient between the elastic member and the plate member, "$\mu 5$" represents a friction coefficient between the plate member and the pressing member, and "$\mu 6$" represents a friction coefficient between the lens and the lens holder.

9. The lens unit according to claim 7, wherein the plate member is a fixed diaphragm.

10. The lens unit according to claim 1, wherein the outer peripheral surface of the lens includes an edge portion, and the edge portion is exposed from the opening.

11. The lens unit according to claim 1, wherein the outer peripheral surface of the lens includes a convex portion, and the convex portion is exposed from the opening.

12. The lens unit according to claim 11, wherein the convex portion is provided at a position corresponding to the opening.

13. The lens unit according to claim 1, wherein the outer peripheral surface of the lens includes a concave portion, and the concave portion is exposed from the opening.

14. The lens unit according to claim 13, wherein the concave portion is provided at a position corresponding to the opening.

15. The lens unit according to claim 1, wherein the pressing member includes an opening.

16. A lens unit that fixes and holds a lens made of plastic after the lens is moved and adjusted in parallel with a receiving surface, the lens unit comprising:
- a lens holder configured to hold the lens, the lens holder including the receiving surface;
- a pressing member configured to be fixed to the lens holder; and
- an elastic member configured to press the lens against the lens holder, the elastic member being located between the pressing member and the lens,
- wherein the pressing member includes an opening through which a tool for moving and adjusting the lens in parallel with the receiving surface by pressing an outer peripheral surface of the lens is inserted,
- wherein a position of the lens is fixed by the pressing member and the elastic member, and
- wherein the outer peripheral surface of the lens is inclined such that the outer peripheral surface is gradually spaced apart from an optical axis of the lens toward a surface of the lens that is in contact with the lens holder.

17. The lens unit according to claim 16, wherein the opening is one of a through-hole and a notch.

18. The lens unit according to claim 16, wherein the opening is provided on a side surface of the pressing member.

19. The lens unit according to claim 16, wherein the opening is provided on a surface perpendicular to a side surface of the pressing member.

20. The lens unit according to claim 16, wherein an exposed portion of the lens that is exposed from the opening has a transmittance lower than a transmittance of an optical surface of the lens.

21. The lens unit according to claim 16, wherein $L>r\theta$,
where "r" represents a distance to the opening from an optical axis of the lens, "θ" represents an angle at which the pressing member is rotated in the optical axis direction with respect to the lens holder when the pressing member is fixed to the lens holder, and "L" represents a length of the opening in a circumferential direction of the pressing member.

22. The lens unit according to claim 16, further comprising a plate member,
wherein the plate member is located between the lens and the elastic member, and
wherein at least one of the following conditions is satisfied:
$\mu 1<\mu 6$;
$\mu 3<\mu 6$; or
$\mu 4<\mu 6$
where "µ1" represents a friction coefficient between the elastic member and the pressing member, "µ3" represents a friction coefficient between the elastic member and the plate member, "µ4" represents a friction coefficient between the plate member and the lens, and "µ6" represents a friction coefficient between the lens and the lens holder.

23. The lens unit according to claim 16, further comprising a plate member,
wherein the plate member is located between the pressing member and the elastic member, and
wherein at least one of the following conditions is satisfied:
$\mu 2<\mu 6$;
$\mu 3<\mu 6$; or
$\mu 5<\mu 6$
where "µ2" represents a friction coefficient between the elastic member and the lens, "µ3" represents a friction coefficient between the elastic member and the plate member, "µ5" represents a friction coefficient between the plate member and the pressing member, and "µ6" represents a friction coefficient between the lens and the lens holder.

* * * * *